(12) United States Patent
Gupta

(10) Patent No.: US 10,334,514 B2
(45) Date of Patent: *Jun. 25, 2019

(54) TECHNIQUES FOR WIRELESS NETWORK DISCOVERY AND SELECTION SUPPORT

(71) Applicants: Intel Corporation, Santa Clara, CA (US); Intel IP Corporation, Santa Clara, CA (US)

(72) Inventor: Vivek Gupta, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/589,912

(22) Filed: May 8, 2017

(65) Prior Publication Data
US 2018/0063776 A1  Mar. 1, 2018

Related U.S. Application Data

(63) Continuation of application No. 14/951,295, filed on Nov. 24, 2015, now Pat. No. 9,648,555, which is a continuation of application No. 14/227,937, filed on Mar. 27, 2014, now Pat. No. 9,451,535.

(60) Provisional application No. 61/841,230, filed on Jun. 28, 2013, provisional application No. 61/806,821, filed on Mar. 29, 2013.

(51) Int. Cl.
| | |
|---|---|
| H04W 4/00 | (2018.01) |
| H04W 48/16 | (2009.01) |
| H04W 48/14 | (2009.01) |
| H04W 8/20 | (2009.01) |
| H04L 12/24 | (2006.01) |
| H04W 48/18 | (2009.01) |
| H04W 84/02 | (2009.01) |
| H04W 88/18 | (2009.01) |

(52) U.S. Cl.
CPC ............. *H04W 48/16* (2013.01); *H04L 41/08* (2013.01); *H04W 8/20* (2013.01); *H04W 48/14* (2013.01); *H04W 48/18* (2013.01); *H04W 84/02* (2013.01); *H04W 88/18* (2013.01)

(58) Field of Classification Search
CPC ...... H04L 41/08; H04W 48/14; H04W 48/16; H04W 48/18; H04W 84/02; H04W 88/18; H04W 8/20

See application file for complete search history.

(56) References Cited

U.S. PATENT DOCUMENTS

| | | | |
|---|---|---|---|
| 2012/0324100 A1* | 12/2012 | Tomici .................. | H04L 45/123 709/224 |
| 2016/0277974 A1* | 9/2016 | Persson ................. | H04W 48/16 |

FOREIGN PATENT DOCUMENTS

| | | |
|---|---|---|
| CN | 102388629 A | 3/2012 |
| GB | 2490623 A | 11/2012 |

* cited by examiner

*Primary Examiner* — Minh Trang T Nguyen

(57) ABSTRACT

Techniques for wireless network discovery and selection support are described. In one embodiment, for example, an evolved packet core (EPC) node may comprise a processor circuit to implement an access network discovery and selection function (ANDSF) according to a management object that includes a branch comprising one or more policies to select a wireless local area network (WLAN), the processing circuitry to receive capabilities information and location information for a user equipment (UE) and determine access network information for the UE based on the capabilities information and the location information. Other embodiments are described and claimed.

23 Claims, 11 Drawing Sheets

*FIG. 9*

_Storage Medium 900_

*Computer Executable Instructions for 700*

*Computer Executable Instructions for 800*

Broadband Wireless Access System 1100

TECHNIQUES FOR WIRELESS NETWORK DISCOVERY AND SELECTION SUPPORT

RELATED CASE

This application is a continuation of, claims the benefit of and priority to previously filed U.S. patent application Ser. No. 14/951,295 filed Nov. 24, 2015, which is a continuation of U.S. patent application Ser. No. 14/227,937 filed Mar. 27, 2014, which claims the benefit of U.S. Provisional Patent Application No. 61/806,821, filed Mar. 29, 2013 and U.S. Provisional Patent Application No. 61/841,230, filed Jun. 28, 2013; all of the above are incorporated herein by reference in their entirety.

TECHNICAL FIELD

Embodiments herein generally relate to communications between devices in broadband wireless communications networks.

BACKGROUND

In a 3rd Generation Partnership Project (3GPP) wireless network such as an evolved universal mobile telecommunications system (UMTS) terrestrial radio access network (E-UTRAN), an access network discovery and selection function (ANDSF) server may be implemented in order to assist user equipment (UEs) in discovering and selecting among available access networks. The ANDSF server may implement an ANDSF management object (MO) and generate access network information for UEs using the ANDSF MO. A common scenario faced by typical UEs may involve selecting among and/or between 3GPP access networks and wireless local area networks (WLANs). As such, it may be desirable that the ANDSF MO comprise a structure designed to yield access network information that supports more efficient WLAN selection and/or utilization by UEs.

BRIEF DESCRIPTION OF THE DRAWINGS

FIG. 9 illustrates an embodiment of a storage medium.

DETAILED DESCRIPTION

Figure 1:
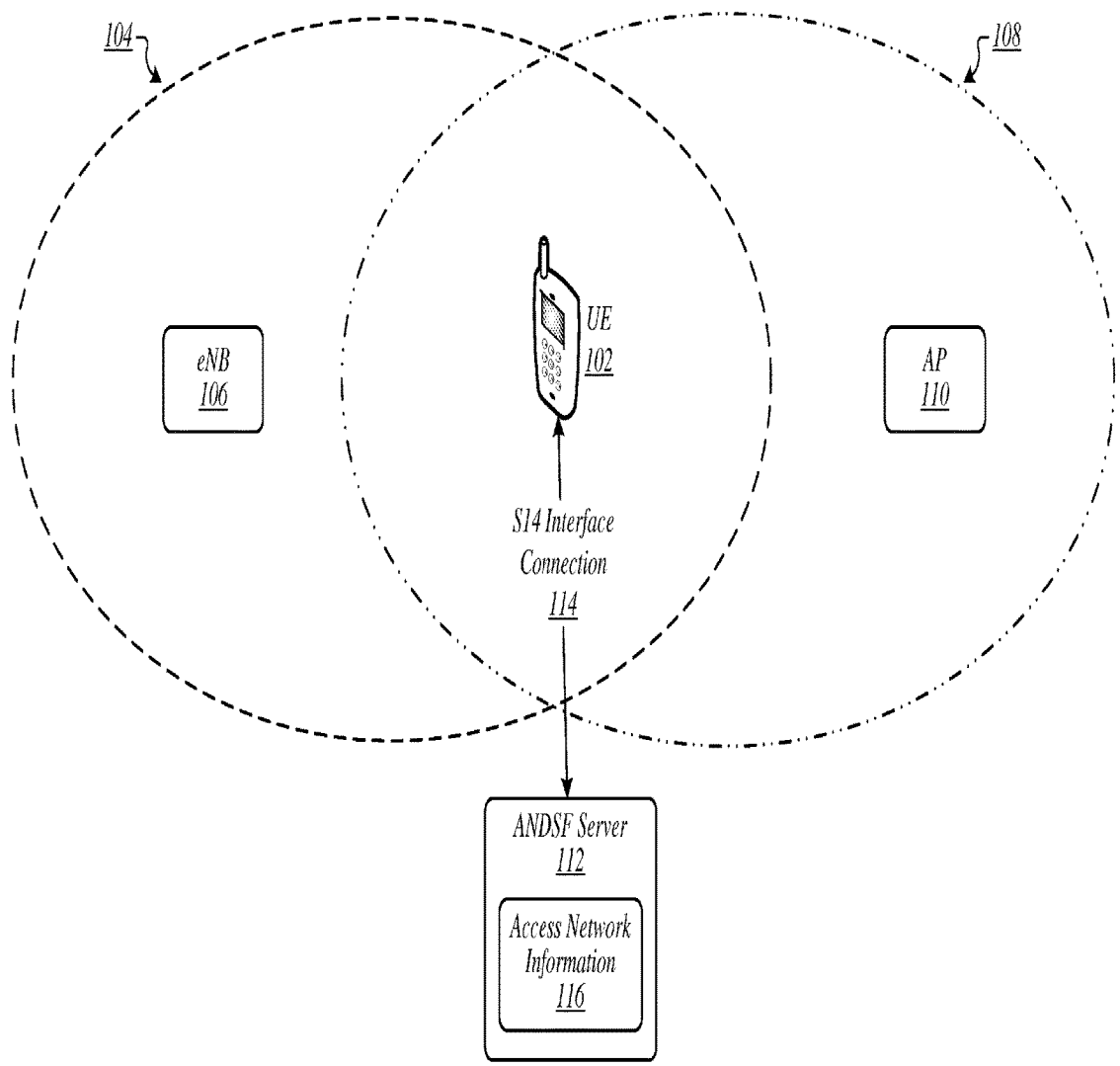
FIG. 1 illustrates an embodiment of an operating environment.

Various embodiments may be generally directed to techniques for wireless network discovery and selection support. In one embodiment, for example, an evolved packet core (EPC) node may comprise a processor circuit to implement an access network discovery and selection function (ANDSF) according to a management object that includes a branch comprising one or more policies to select a wireless local area network (WLAN), the processing circuitry to receive capabilities information and location information for a user equipment (UE) and determine access network information for the UE based on the capabilities information and the location information. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their revisions, progeny and variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/ High Speed Packet Access (HSPA), and/or GSM with General Packet Radio Service (GPRS) system (GSM/GPRS) technologies and/or standards, including their revisions, progeny and variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, LTE-Unlicensed standards, and/or near-field communication (NFC) standards such as standards developed by the NFC Forum, including any revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an operating environment 100 such as may be representative of some embodiments. In operating environment 100, a UE 102 is located in a region of overlap between a coverage area 104 of an eNB 106 and a coverage area 108 of an wireless access point (AP) 110. UE 102 may comprise a dual-mode UE that is capable, of communicating with both a 3GPP access network, such as an evolved UMTS terrestrial radio access network (E-UTRAN), and a non-3GPP access network, such as a Wi-Fi access network. Via an E-UTRAN of eNB 106, UE 102 may be capable of communicating with an evolved packet core (EPC), through which it may obtain connectivity with a packet data network (PDN) such as the Internet. UE 102 may also be capable of obtaining connectivity to that same PDN through a Wi-Fi access network of AP 110.

In order to obtain information for use in discovering an access network via which to connect to the Internet or another PDN, UE 102 may communicate with an access network discovery and selection function (ANDSF) server 112 over an S14 interface connection 114. The ANDSF server 112 may provide UE 102 with access network information 116 that identifies available access networks in the vicinity of UE 102 and/or provides one or more rules, policies, or criteria for UE 102 to apply when selecting among available access networks. The embodiments are not limited in this context.

Figure 2:
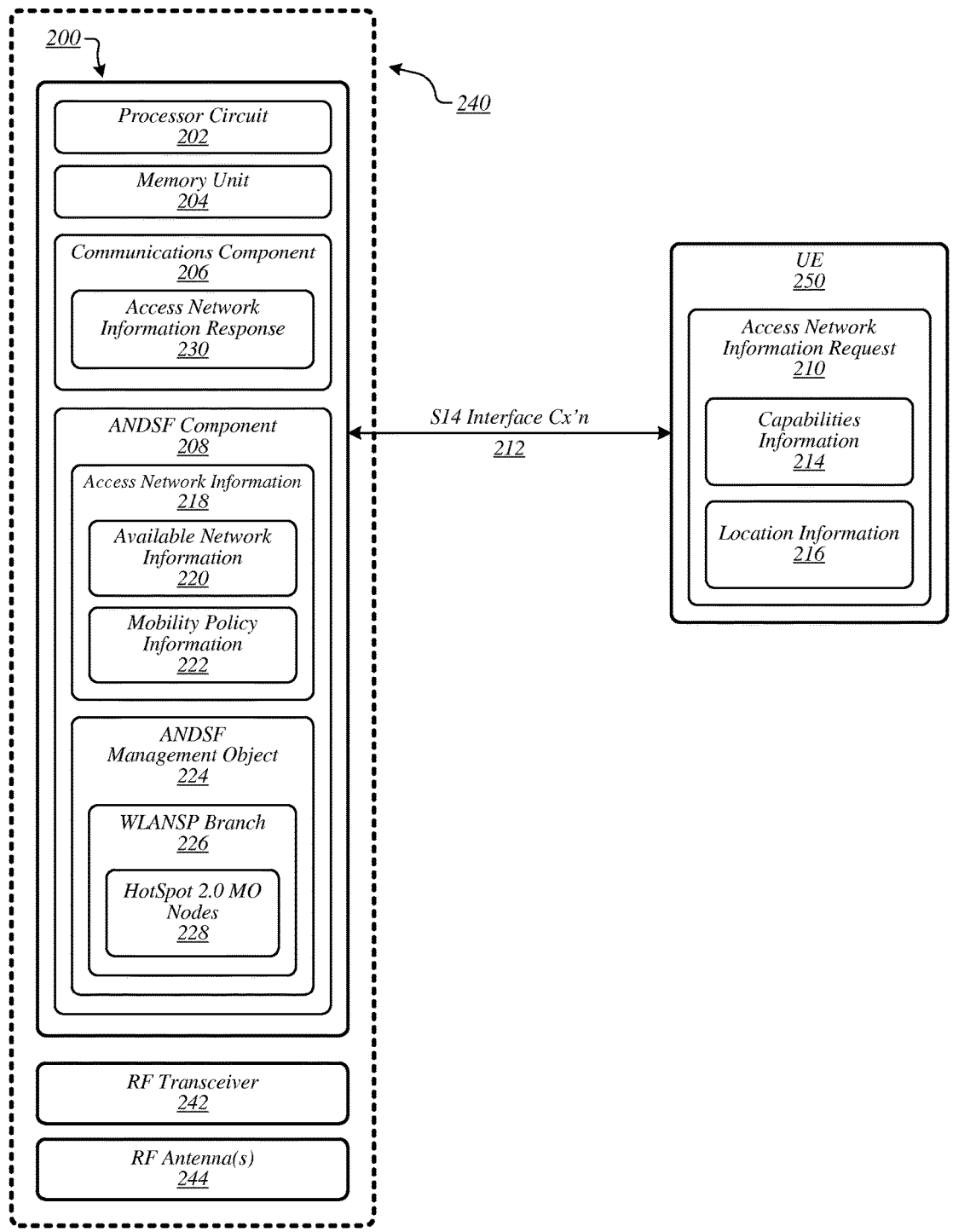
FIG. 2 illustrates an embodiment of a first apparatus and an embodiment of a first system.

FIG. 2 illustrates a block diagram of an apparatus 200 such as may be representative of ANDSF server 112 of FIG. 1 in various embodiments. As shown in FIG. 2, apparatus 200 comprises multiple elements including a processor circuit 202, a memory unit 204, a communications component 206, and an ANDSF component 208. The embodiments, however, are not limited to the type, number, or arrangement of elements shown in this figure.

In some embodiments, apparatus 200 may comprise processor circuit 202. Processor circuit 202 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 202 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 202 may be implemented as a general purpose processor, such as a processor made by Intel® Corporation, Santa Clara, Calif. The embodiments are not limited in this context.

In various embodiments, apparatus 200 may comprise or be arranged to communicatively couple with a memory unit 204. Memory unit 204 may be implemented using any machine-readable or computer-readable media capable of storing data, including both volatile and non-volatile memory. For example, memory unit 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 204 may be included on the same integrated circuit as processor circuit 202, or alternatively some portion or all of memory unit 204 may be disposed on an integrated circuit or other medium, for example a hard disk drive, that is external to the integrated circuit of processor circuit 202. Although memory unit 204 is comprised within apparatus 200 in FIG. 2, memory unit 204 may be external to apparatus 200 in some embodiments. The embodiments are not limited in this context.

In various embodiments, apparatus 200 may comprise a communications component 206. Communications component 206 may comprise logic, circuitry, and/or instructions operative to send messages to one or more remote devices and/or to receive messages from one or more remote devices. In some embodiments, communications component 206 may be operative to send and/or receive messages over one or more wired connections, one or more wireless connections, or a combination of both. In various embodiments, communications component 206 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In some embodiments, apparatus 200 may comprise a ANDSF component 208. ANDSF component 208 may comprise logic, circuitry, and/or instructions operative to perform operations to support wireless network discovery and selection on the part of one or more remote devices. In various embodiments, ANDSF component 208 may be operative to generate access network information for use by remote devices in selecting access networks via which to obtain connectivity to PDNs such as the Internet. The embodiments are not limited in this context.

FIG. 2 also illustrates a block diagram of a system 240. System 240 may comprise any of the aforementioned elements of apparatus 200. System 240 may further comprise a radio frequency (RF) transceiver 242. RF transceiver 242 may comprise one or more radios capable of transmitting and receiving signals using various suitable wireless communications techniques. Such techniques may involve communications across one or more wireless networks. Exemplary wireless networks include (but are not limited to) cellular radio access networks, wireless local area networks (WLANs), wireless personal area networks (WPANs), wireless metropolitan area network (WMANs), and satellite networks. In communicating across such networks, RF transceiver 242 may operate in accordance with one or more applicable standards in any version. The embodiments are not limited in this context.

In some embodiments, system 240 may comprise one or more RF antennas 244. Examples of any particular RF antenna 244 may include, without limitation, an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. In various embodiments, RF transceiver 242 may be operative to send and/or receive messages and/or data using one or more RF antennas 244. The embodiments are not limited in this context.

In some embodiments, during operation of apparatus 200 and/or system 240, communications component 206 may be operative to receive an access network information request 210 from a UE 250. In various embodiments, access network information request 210 may comprise a request for information that is usable by UE 250 to select an access network via which to obtain connectivity to a PDN such as the Internet. In some embodiments, the UE 250 may comprise a dual-mode UE that is capable of communicating with both a 3GPP access network, such as an E-UTRAN, and a non-3GPP access network, such as a Wi-Fi access network. In various embodiments, the UE 250 may be located in a region of overlapping coverage of multiple access networks, such as a region in which in which coverage of an E-UTRAN overlaps with coverage of a Wi-Fi access network. In some embodiments, apparatus 200 and/or system 240 may be operative to communicate with UE 250 via an internet protocol (IP)-layer interface. For example, in various embodiments, apparatus 200 and/or system 240 may be operative to communicate with UE 250 over an S14 interface connection 212. In some such embodiments, communications component 206 may be operative to receive access network information request 210 via the S14 interface connection. The embodiments are not limited in this context.

In various embodiments, access network information request 210 may comprise capabilities information 214. Capabilities information 214 may comprise information describing wireless network access capabilities of UE 250. In some embodiments, capabilities information 214 may identify one or more types of wireless access networks and/or access technologies that UE 250 is capable of using. In various embodiments, capabilities information 214 may indicate that UE 250 is capable of communicating with both a 3GPP access network, such as an E-UTRAN, and a non-3GPP access network, such as a Wi-Fi access network. The embodiments are not limited to this example.

In some embodiments, access network information request 210 may comprise location information 216. Location information 216 may comprise information identifying or describing an approximate location of UE 250. In various embodiments, location information 216 may identify an approximate geographical location of UE 250. In some embodiments, for example, location information 216 may comprise global positioning system (GPS) coordinates for UE 250. In various embodiments, location information 216 may additionally or alternatively comprise a cell identifier (ID) that identifies a cell in which UE 250 is currently located. In some embodiments, location information 216 may additionally or alternatively comprise a tracking area identity (TAI) that identifies a tracking area in which UE 250 is currently located. The embodiments are not limited in this context.

In various embodiments, based on the access network information request 210, ANDSF component 208 may be operative to generate access network information 218. Access network information 218 may generally comprise information that is usable by UE 250 to select an access network via which to obtain connectivity to a PDN such as the Internet. In some embodiments, ANDSF component 208 may be operative to generate access network information 218 based on capabilities information 214 and/or location information 216 provided in the access network information request 210. In various embodiments, access network information 218 may comprise available network information 220. Available network information 220 may comprise information identifying one or more access networks via which UE 250 may obtain PDN connectivity. In some embodiments, access network information 218 may comprise mobility policy information 222. Mobility policy information 222 may comprise information identifying, defining, describing, and/or updating rules and/or preferences to be applied by UE 250 in selecting from among access networks identified by available network information 220. The embodiments are not limited in this context.

In various embodiments, ANDSF component 208 may be operative to generate access network information 218 based on an ANDSF management object 224. ANDSF management object 224 may comprise an object via which ANDSF component 208 manages, tracks, defines, identifies, modifies, updates, and/or controls features, capabilities, functions, operations, properties, and/or characteristics of UE 250. In some embodiments, ANDSF management object 224 may comprise a management object that is compatible with the Open Mobile Alliance (OMA) Device Management (DM) protocol specifications, versions 1.2 and later. In various embodiments, ANDSF management object 224 may be defined using the OMA DM Device Description Framework (DDF). The embodiments are not limited in this context.

In some embodiments, ANDSF management object 224 may comprise a tree structure in which a plurality of top-level branches extend from a root node to a plurality of top-level nodes. In various embodiments, one or more top-level leaves may also extend from the root node. In some embodiments, from a given top-level node, one or more lower-level branches may extend to one or more respective lower-level nodes. In various embodiments, one or more lower-level leaves may extend from a given top-level node. In some embodiments, additional lower-level branches and/or leaves may extend from one or more respective lower-level nodes. The embodiments are not limited in this context.

In various embodiments, ANDSF management object 224 may comprise an enhanced structure designed to improve the efficiency, accuracy, and/or reliability with which ANDSF component 208 generates access network information 218 and/or with which remote devices such as UE 250 are able to utilize access network information 218 to perform access network selections. More particularly, in some embodiments, ANDSF management object 224 may comprise an enhanced structure that supports more efficient WLAN selection and/or utilization on the part of remote devices such as UE 250. In various embodiments, according to the enhanced structure, ANDSF management object 224 may comprise a WLAN selection policies (WLANSP) branch 226. In some such embodiments, the WLANSP branch 226 may be comprised among the top-level branches of ANDSF management object 224. In various other embodiments, the WLANSP branch 226 may comprise a lower-level branch. The embodiments are not limited in this context.

In some embodiments, the enhanced structure of ANDSF management object 224 may include one or more nodes 228 of a Hotspot 2.0 management object (MO). In various embodiments, the enhanced structure may include some Hotspot 2.0 MO nodes and/or branches and exclude some other Hotspot 2.0 MO nodes and/or branches. In some embodiments, the enhanced structure of ANDSF management object 224 may include Hotspot 2.0 MO nodes and/or branches that are relevant for UE WLAN selection and exclude Hotspot 2.0 MO nodes and/or branches that are not relevant for UE WLAN selection. In various embodiments, the included Hotspot 2.0 MO nodes 228 may be comprised in the WLANSP branch 226 within the enhanced structure of ANDSF management object 224. In some embodiments, one or more included Hotspot 2.0 MO nodes 228 may comprise nodes at a top level of the WLANSP branch 226. In various embodiments, one or more included Hotspot 2.0 MO nodes 228 may comprise nodes at lower levels within the WLANSP branch 226. For example, in some embodiments, the WLANSP branch 226 may include a designated sub-branch for the inclusion of one or more Hotspot 2.0 MO nodes defining criteria for use as criteria in WLAN selection. The embodiments are not limited in this context.

Figure 3:
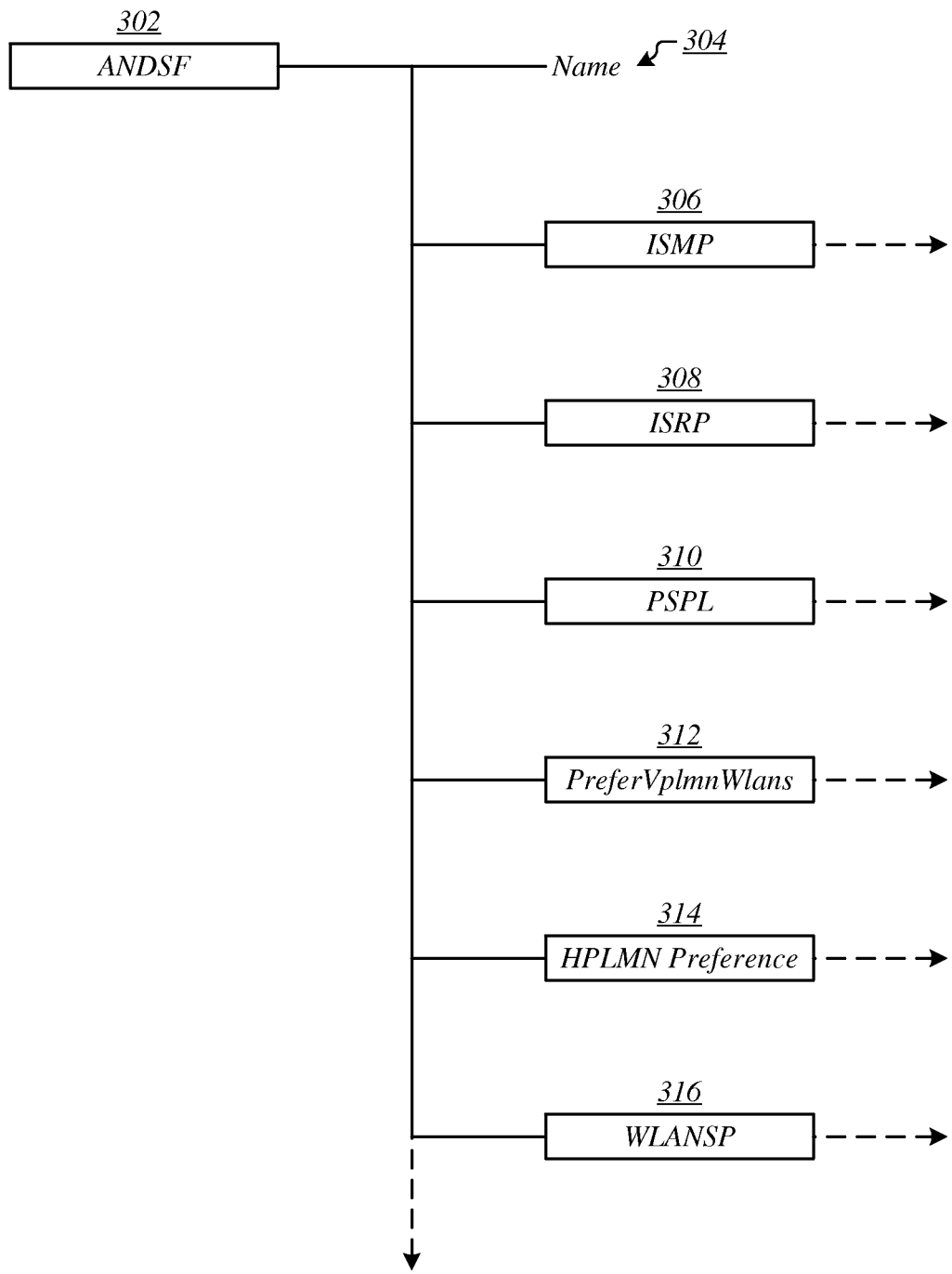
FIG. 3 illustrates an embodiment of a management object.

FIG. 3 illustrates a management object 300 such as may be representative of ANDSF management object 224 of FIG. 2 in various embodiments. More particularly, FIG. 3 illustrates a root node, a top-level leaf, and a plurality of top-level nodes of the example management object 300. As shown in FIG. 3, management object 300 includes an ANDSF node 302, which may comprise root node for management object 300. Extending from ANDSF node 302 is a Name leaf 304, which may comprise a name for the collection of ANDSF settings represented by management object 300. Also extending from ANDSF node 302 are an inter-system mobility policy (ISMP) node 306, an inter-system routing policy (ISRP) node 308, a preferred service provider list (PSPL) node 310, a PreferVplmnWlans node 312, a home public land mobile network (HPLMN) preference node 314, and a WLANSP node 316. It is worthy of note that in some embodiments, there may be other top-level leaves and/or nodes that extend from ANDSF node 302. Additionally or alternatively, in various embodiments, management object 300 may not comprise one or more of Name leaf 304, ISMP node 306, ISRP node 308, PSPL node 310, PreferVplmnWlans node 312, HPLMN preference node 314, and WLANSP node 316. The embodiments are not limited in this context.

In some embodiments, ISMP node 306 may define an ISMP branch of management object 300 that comprises one or more ISMP rules. In various embodiments, management object 300 may comprise an enhanced structure according to which an AccessId leaf and a SecondaryAccessId leaf are omitted from a PrioritizedAccess node comprised in the ISMP branch. In some embodiments, ISRP node 308 may define an ISRP branch of management object 300 that comprises one or more ISRP rules. In various embodiments, management object 300 may comprise an enhanced structure according to which an AccessId leaf and a SecondaryAccessId leaf are omitted from a RoutingRule node comprised in the ISRP branch. In some embodiments, PSPL node 310 may define a PSPL branch of management object 300 that comprises a list of home operator-preferred service providers. In various embodiments, PreferVplmnWlans node 312 may define a PreferVplmnWlans branch comprising one or more rules for determining whether visited public land mobile network (VPLMN)-provided WLANs are to be preferred. In various embodiments, HPLMN preference node 314 may define an HPLMN branch comprising one or more rules for the establishment of PDN connections over WLAN access networks using applicable S2a and/or S2b procedures. In some embodiments, WLANSP node 316 may define a WLANSP branch, such as may comprise an example of WLANSP branch 226 of FIG. 2. In various embodiments, the WLANSP branch may comprise one or more lists of preferred WLANs. In some embodiments, each such list may comprise a different priority, be applicable to a different priority area, and/or be applicable during a different time of day. The embodiments are not limited in this context.

Figure 4:
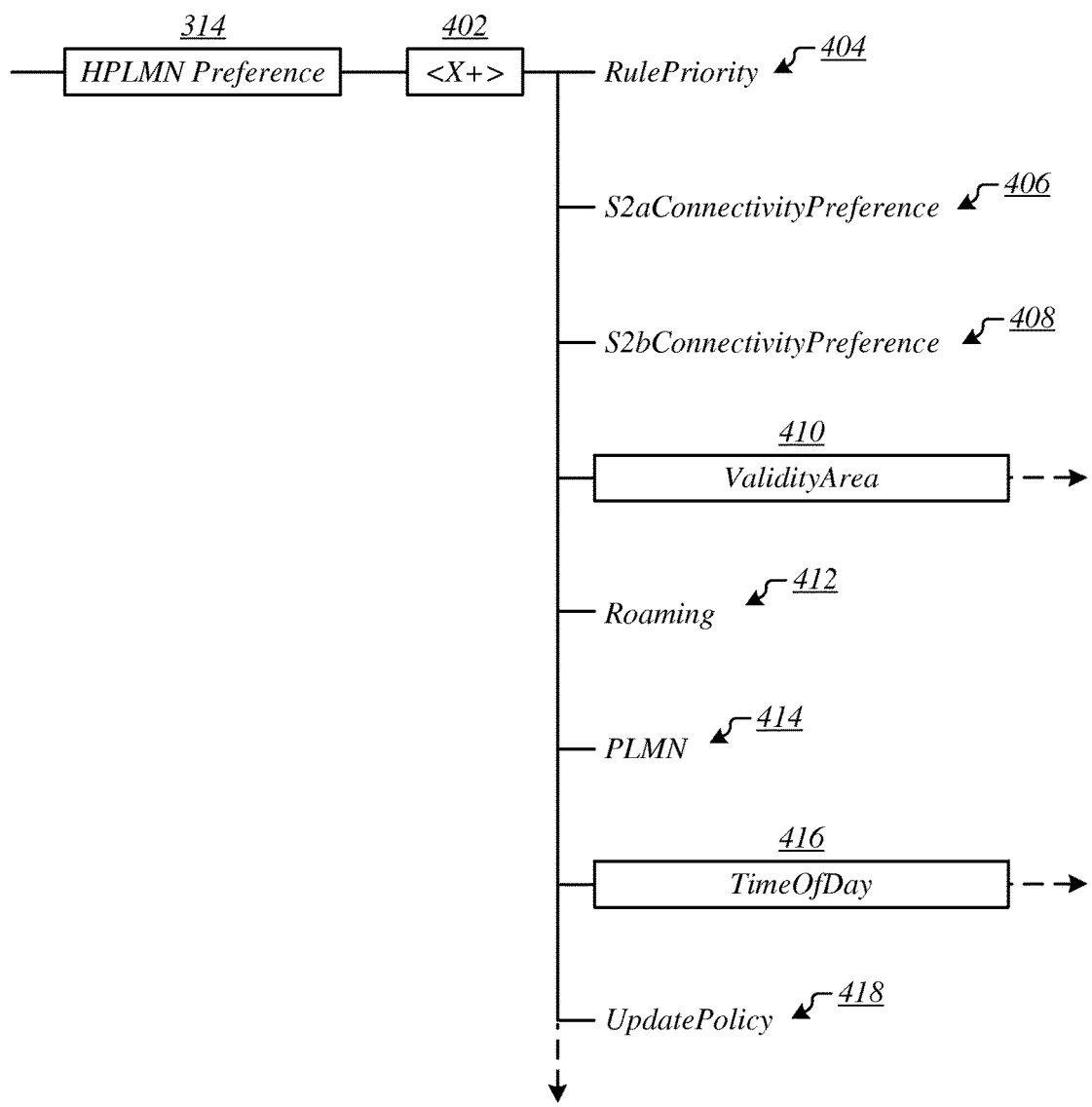
FIG. 4 illustrates an embodiment of a first management object branch.

FIG. 4 illustrates a management object branch 400 such as may be representative of an HPLMN branch defined by HPLMN node 314 of FIG. 3 in various embodiments. As shown in FIG. 4, management object branch 400 may comprise an <X+> node 402 that extends from HPLMN preference node 314. <X+> node 402 may signify that one or more HPLMN preference rules may be defined according to management object branch 400, each such rule comprising a corresponding set of parameters defined by the various nodes and/or leaves that extend from the <X+> node 402. The nodes and leaves that extend from <X+> node 402 may include a RulePriority leaf 404, an S2aConnectivityPreference leaf 406, an S2bConnectivityPreference leaf 408, a ValidityArea node 410, a Roaming leaf 412, a PLMN leaf 414, a TimeOfDay node 416, and an UpdatePolicy leaf 418. It is worthy of note that in some embodiments, there may be other nodes and/or leaves that extend from <X+> node 402. Additionally or alternatively, in various embodiments, management object branch 400 may not comprise one or more of RulePriority leaf 404, S2aConnectivityPreference leaf 406, S2bConnectivityPreference leaf 408, ValidityArea node 410, Roaming leaf 412, PLMN leaf 414, TimeOfDay node 416, and UpdatePolicy leaf 418. The embodiments are not limited in this context.

In various embodiments, RulePriority leaf 420 may comprise a value indicating a relative priority for a rule defined according to management object branch 400. In some embodiments, S2aConnectivityPreference leaf 406 may comprise an indication of whether a home operator prefers that a UE use S2a procedures to establish a PDN connection over a WLAN access network. In various embodiments, S2bConnectivityPreference leaf 408 may comprise an indication of whether a home operator prefers that a UE use S2b procedures to establish a PDN connection over a WLAN access network. In some embodiments, ValidityArea node 410 may define a ValidityArea sub-branch of management object branch 400 that comprises one or more location conditions for an HPLMN preference rule defined by management object branch 400. In various embodiments, Roaming leaf 412 may comprise an indication of whether a rule defined according to management object branch 400 is valid when a UE is roaming In some embodiments, PLMN leaf 414 may identify a PLMN to which an HPLMN preference rule defined by management object branch 400 applies. In various embodiments, TimeOfDay node 416 may define a TimeOfDay sub-branch of management object branch 400 that comprises one or more time of day conditions for an HPLMN preference rule defined by management object branch 400. In some embodiments, UpdatePolicy leaf 418 may comprise an indication of whether an update is to be requested for a rule defined according to management object branch 400 when the rule is no longer considered valid.

In some embodiments, ValidityArea node 410, Roaming leaf 412, PLMN leaf 414, and TimeOfDay node 416 may collectively comprise a set of validity criteria for an HPLMN preference rule defined by management object branch 400. In various embodiments, such a rule may apply only under circumstances that match that set of validity criteria. In some embodiments, if none of the leaves and nodes in the set of validity criteria are included, then an HPLMN preference rule may be considered to be valid. In various embodiments, there may be multiple HPLMN preference rules defined for a given UE according to management object branch 400. In some embodiments, at a particular point in time, more than one of those rules may be valid. In various embodiments, an ANDSF server such as ANDSF server 112 of FIG. 1 may implement a rule according to which at most one HPLMN preference rule may be active for a given UE at a given point in time. In some embodiments, when multiple HPLMN preference rules are valid for a particular UE, an active HPLMN preference rule for the UE may be selected based on the respective rule priorities for the multiple HPLMN preference rules, which may be comprised in their respective RulePriority leaves 404. In various embodiments, a visited ANDSF (V-ANDSF) server may refrain from providing HPLMN preference rules to roaming UEs. The embodiments are not limited in this context.

Figure 5:
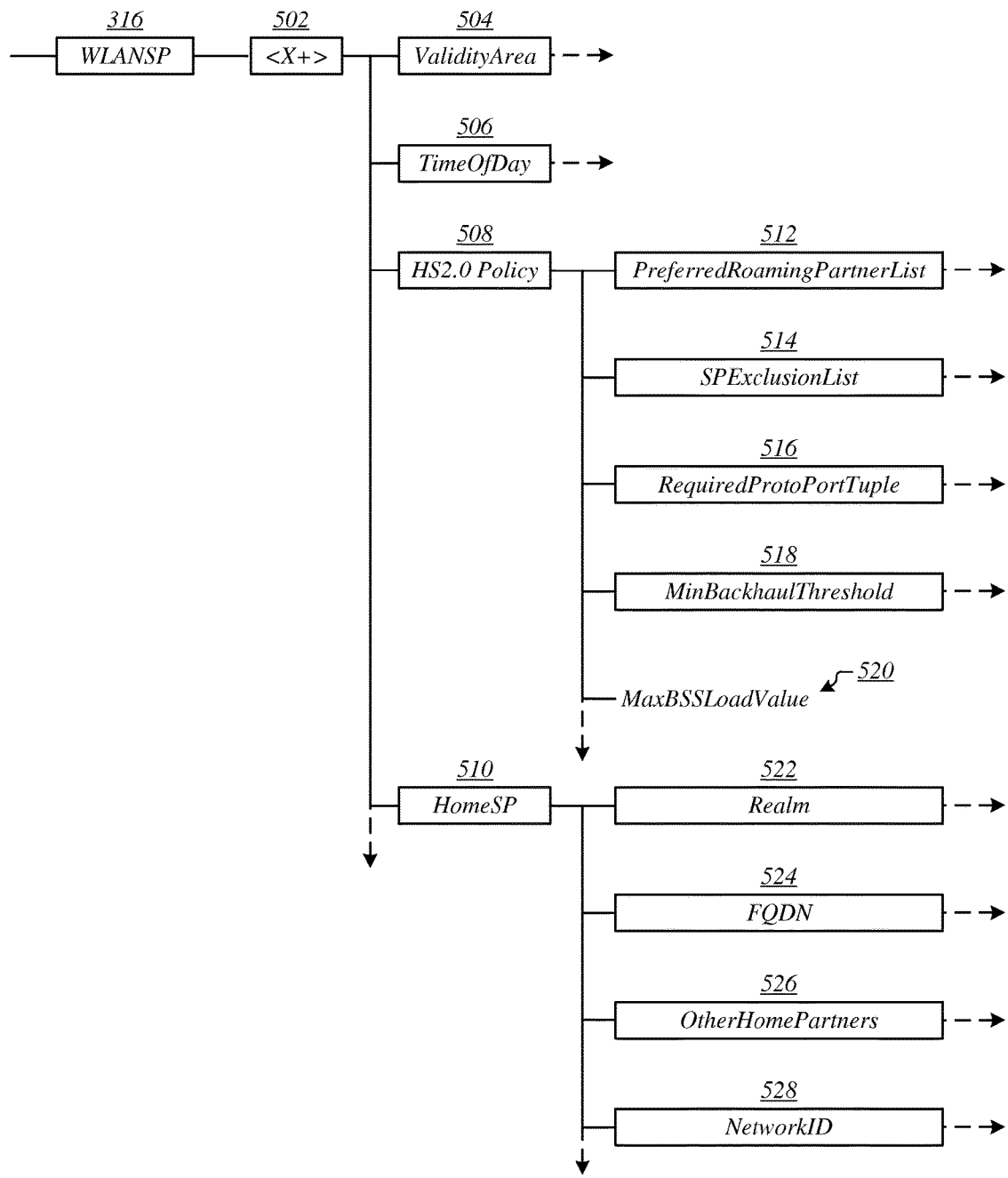
FIG. 5 illustrates an embodiment of a second management object branch.

FIG. 5 illustrates a management object branch 500 such as may be representative of WLANSP branch 226 of FIG. 2 and/or a WLANSP branch defined by WLANSP node 316 of FIG. 3 in various embodiments. As shown in FIG. 5, management object branch 500 may comprise an <X+> node 502 that extends from WLANSP node 316. <X+> node 502 may signify that one or more WLANSP rules may be defined according to management object branch 500, each such rule comprising a corresponding set of parameters defined by the various nodes and/or leaves that extend from the <X+> node 502. The nodes that extend from <X+> node 502 may include a ValidityArea node 504, a TimeOfDay node 506, an HS2.0 Policy node 508, and a HomeSP node 510. It is worthy of note that in some embodiments, there may be other nodes and/or leaves that extend from <X+> node 502. Additionally or alternatively, in various embodiments, management object branch 500 may not comprise one or more of ValidityArea node 504, TimeOfDay node 506, HS2.0 Policy node 508, and HomeSP node 510. The embodiments are not limited in this context.

In some embodiments, ValidityArea node 504 may define a ValidityArea sub-branch of management object branch 500 that comprises one or more location conditions for a WLANSP rule defined by management object branch 500. In various embodiments, TimeOfDay node 506 may define a TimeOfDay sub-branch of management object branch 500 that comprises one or more time of day conditions for a WLANSP rule defined by management object branch 500. In some embodiments, HS2.0 Policy node 508 may define an HS2.0 Policy sub-branch of management object branch 500 that comprises one or more selection criteria for selecting WLAN access networks. In various embodiments, HomeSP node 510 may define a HomeSP sub-branch of management object branch 500 that comprises home service provider information. The embodiments are not limited in this context.

In some embodiments, HS2.0 Policy node 508 may define an HS2.0 Policy sub-branch that comprises a PreferredRoamingPartnerList node 512, an SPExclusionList node 514, a RequiredProtoPortTuple node 516, a MinBackhaulThreshold node 518, and a MaxBSSLoadValue leaf 520. It is worthy of note that in various embodiments, the HS2.0 Policy sub-branch may comprise other nodes and/or leaves. Additionally or alternatively, in some embodiments, the HS2.0 Policy sub-branch may not comprise one or more of PreferredRoamingPartnerList node 512, SPExclusionList node 514, RequiredProtoPortTuple node 516, MinBackhaulThreshold node 518, and MaxBSSLoadValue leaf 520. Further, although it is not depicted in FIG. 5, in various embodiments an <X+> node may extend from HS2.0 Policy node 508, and one or more of PreferredRoamingPartnerList node 512, SPExclusionList node 514, RequiredProtoPortTuple node 516, MinBackhaulThreshold node 518, and MaxBSSLoadValue leaf 520 may extend from the <X+> node. In some such embodiments, the <X+> node may signify that one or more WLAN selection criteria may be defined according to the HS2.0 Policy sub-branch, each such selection criteria comprising a corresponding set of parameters defined by the various nodes and/or leaves that extend from the <X+> node. The embodiments are not limited in this context.

In various embodiments, the HS2.0 Policy sub-branch may comprise PreferredRoamingPartnerList node 512. In some embodiments, PreferredRoamingPartnerList node 512 may comprise a list of preferred roaming partners for use by a UE to obtain PDN connectivity while roaming In various embodiments, the PreferredRoamingPartnerList node 512 may define a sub-branch that identifies, for each preferred roaming partner, a corresponding fully qualified domain name (FQDN) and/or country code. In some embodiments, PreferredRoamingPartnerList node 512 may be the same as or similar to a PreferredRoamingPartnerList node defined in a PerProviderSubscription/X+>/Policy sub-branch of the WFA Technical Committee "Hotspot 2.0 (Release 2) Technical Specification" ("the Hotspot 2.0 specification"). The embodiments are not limited in this context.

In various embodiments, the HS2.0 Policy sub-branch may comprise SPExclusionList node 514. In some embodiments, SPExclusionList node 514 may comprise a list of service set identifiers (SSIDs) that are not preferred by a home service provider of a UE. In various embodiments, the non-preferred SSIDs may correspond to WLANs that may not be autonomously selected by the UE but may be manually selected by a user of the UE. In some embodiments, SPExclusionList node 514 may be the same as or similar to an SPExclusionList node defined in a PerProviderSubscription/<X+>/Policy sub-branch of the Hotspot 2.0 specification. The embodiments are not limited in this context.

In various embodiments, the HS2.0 Policy sub-branch may comprise RequiredProtoPortTuple node 516. In some embodiments, RequiredProtoPortTuple node 516 may comprise required IP protocols and port numbers of one or more operator-supported applications of a UE. In various embodiments, RequiredProtoPortTuple node 516 may be the same as or similar to an RequiredProtoPortTuple node defined in a PerProviderSubscription/<X+>/Policy sub-branch of the Hotspot 2.0 specification. The embodiments are not limited in this context.

In some embodiments, the HS2.0 Policy sub-branch may comprise MinBackhaulThreshold node 518. In various embodiments, MinBackhaulThreshold node 518 may comprise a policy specifying a minimum available backhaul threshold for application in selecting a WLAN. In some embodiments, MinBackhaulThreshold node 518 may be the same as or similar to a MinBackhaulThreshold node defined in a PerProviderSubscription/<X+>/Policy sub-branch of the Hotspot 2.0 specification. The embodiments are not limited in this context.

In various embodiments, the HS2.0 Policy sub-branch may comprise MaxBSSLoadValue leaf 520. In some embodiments, MaxBSSLoadValue leaf 520 may comprise a policy specifying a maximum basic service set (BSS) load for application in selecting a WLAN. In various embodiments, the policy specified by MaxBSSLoadValue leaf 520 may apply only in the presence of a UE's home network. In some embodiments, MaxBSSLoadValue leaf 520 may be the same as or similar to an MaxBSSLoadValue leaf defined in a PerProviderSubscription/<X+>/Policy sub-branch of the Hotspot 2.0 specification. The embodiments are not limited in this context.

In various embodiments, HomeSP node 510 may define a HomeSP sub-branch that comprises a Realm node 522, an FQDN node 524, an OtherHomePartners node 526, and a NetworkID node 528. It is worthy of note that in some embodiments, the HomeSP sub-branch may comprise other nodes and/or leaves. Additionally or alternatively, in various embodiments, the HomeSP sub-branch may not comprise one or more of Realm node 522, FQDN node 524, OtherHomePartners node 526, and NetworkID node 528. Further, in some embodiments, management object branch 500 may not comprise HomeSP node 510, and thus may not comprise an HomeSP sub-branch. The embodiments are not limited in this context.

In various embodiments, the HomeSP sub-branch may comprise Realm node 522. In some embodiments, Realm node 522 may comprise information identifying a realm of a home service provider. In various embodiments, whether a UE is expected to be able to successfully authenticate to a WLAN may be determined by comparing a realm identified via Realm node 522 with a realm returned in a Hotspot 2.0 network access identifier (NAI) realm access network query protocol (ANQP) element. In some embodiments, Realm node 522 may be the same as or similar to a Realm node defined in the Hotspot 2.0 specification. In various embodiments, the HomeSP sub-branch may comprise FQDN node 524. In some embodiments, FQDN node 524 may comprise information identifying an FQDN of a home service provider. In various embodiments, FQDN node 524 may be the same as or similar to an FQDN node defined in the Hotspot 2.0 specification. The embodiments are not limited in this context.

In some embodiments, the HomeSP sub-branch may comprise OtherHomePartners node 526. In various embodiments, OtherHomePartners node 526 may comprise a list of home service provider partners that are home hotspot operators of a UE. In some embodiments, a UE may recognize FQDNs corresponding to such home service provider partners as being associated with the home service provider. In various embodiments, OtherHomePartners node 526 may be the same as or similar to an OtherHomePartners node defined in the Hotspot 2.0 specification. In some embodiments, the HomeSP sub-branch may comprise NetworkID node 528. In various embodiments, NetworkID node 528 may comprise information specifying an {SSID, homogeneous extended SSID (HESSID)} duple identifying a home service provider WLAN. In some embodiments, NetworkID node 528 may be the same as or similar to a NetworkID node defined in the Hotspot 2.0 specification. The embodiments are not limited in this context.

In various embodiments, one or more Hotspot 2.0 MO parameters, nodes, branches, and/or leaves may be excluded from ANDSF management object 224 and/or WLANSP branch 226 of FIG. 2, management object 300 of FIG. 3, and/or management object branch 500 of FIG. 5. For example, because 3GPP mobile devices typically support subscription to a single home operator via subscriber identity module (SIM) or universal SIM (USIM), portions of the Hotspot 2.0 MO that pertain to scenarios involving multiple subscriptions may not be relevant for WLAN selection by a UE. Thus, in some embodiments, one or more such portions of the Hotspot 2.0 MO may be excluded from ANDSF management object 224 and/or WLANSP branch 226 of FIG. 2, management object 300 of FIG. 3, and/or management object branch 500 of FIG. 5. In an example embodiment, ANDSF management object 224 and/or WLANSP branch 226 of FIG. 2, management object 300 of FIG. 3, and/or management object branch 500 of FIG. 5 may exclude SubscriptionPriority, Subscription Remediation, AAAServerTrustRoot, SubscriptionUpdate, SubscriptionParameters, Credential, and/or Extension branches of the Hotspot 2.0 MO. The embodiments are not limited in this context.

Returning to FIG. 2, in various embodiments, in response to access network information request 210, communications component 206 may be operative to send an access network information response 230. In some embodiments, access network information response 230 may comprise access network information 218 generated by ANDSF component 208 using ANDSF management object 224. In various embodiments, some or all of the access network information 218 in access network information response 230 may comprise access network information generated based on policies, rules, values, and/or other parameters specified in WLANSP branch 226. In some embodiments, some or all of that access network information 218 may comprise access network information generated based on HotSpot 2.0 MO nodes 228. In various embodiments, the access network information 218 that communications component 206 includes in access network information response 230 may comprise the available network information 220 and/or the mobility policy information 222. The embodiments are not limited in this context.

In some embodiments, communications component 206 may be operative to send access network information response 230 to UE 250 via S14 interface connection 212. In various embodiments, UE 250 may be operative to use access network information 218 received in access network information response 230 to select an access network via which to obtain connectivity to a PDN such as the Internet. For example, in some embodiments in which UE 250 is located within a region in which coverage of an E-UTRAN overlaps with coverage of a Wi-Fi access network, UE 250 may be operative to use access network information 218 received in access network information response 230 to determine whether to obtain Internet connectivity via the E-UTRAN or to obtain Internet connectivity via the Wi-Fi access network. The embodiments are not limited in this context.

Figure 6:
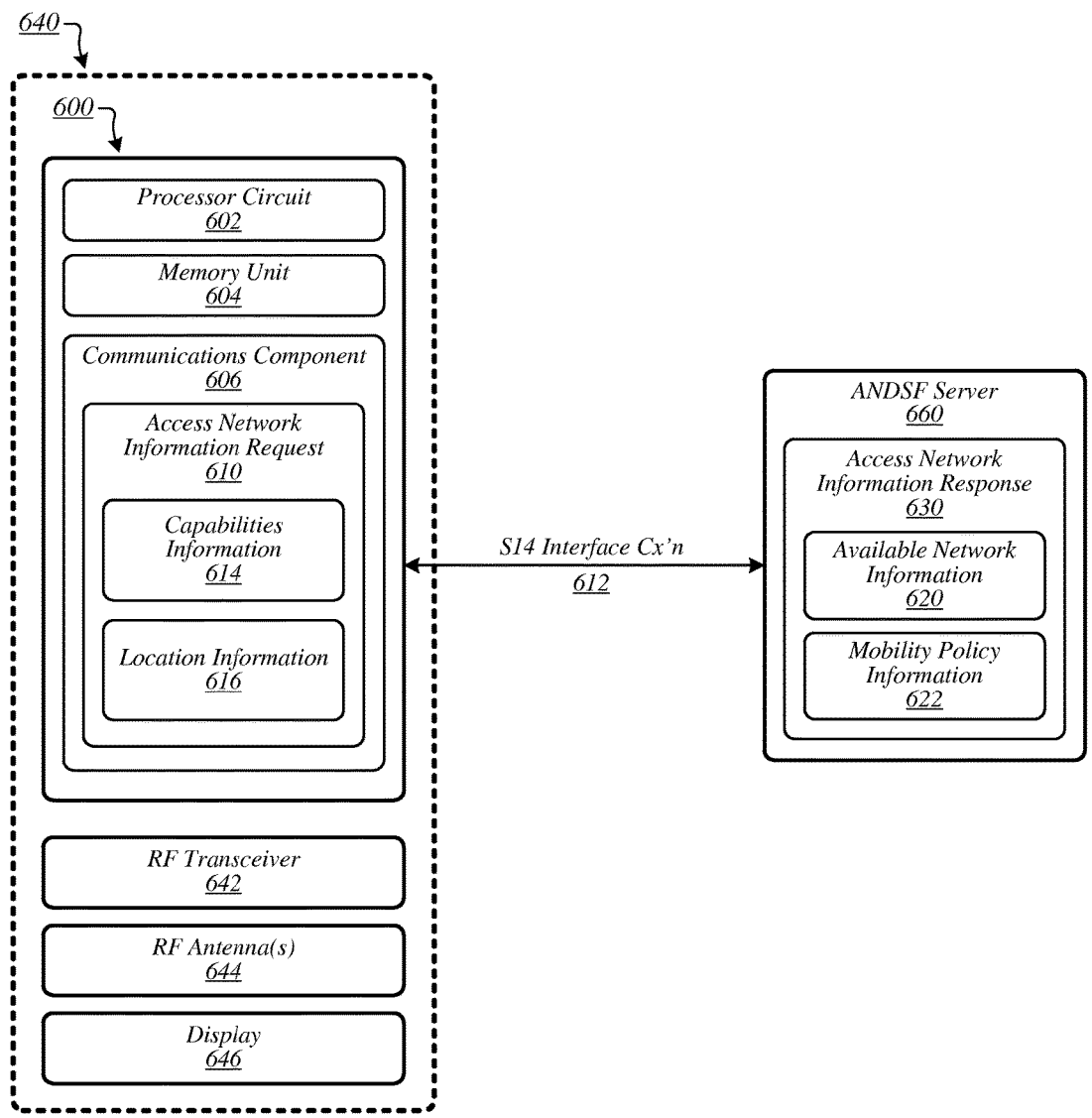
FIG. 6 illustrates an embodiment of a second apparatus and an embodiment of a second system.

FIG. 6 illustrates a block diagram of an apparatus 600 such as may be representative of UE 102 of FIG. 1 and/or UE 250 of FIG. 2 in various embodiments. As shown in FIG. 6, apparatus 600 comprises multiple elements including a processor circuit 602, a memory unit 604, and a communications component 606. The embodiments, however, are not limited to the type, number, or arrangement of elements shown in this figure.

In some embodiments, apparatus 600 may comprise processor circuit 602. Processor circuit 602 may be implemented using any processor or logic device. Examples of processor circuit 602 may include, without limitation, any of the examples previously presented with respect to processor circuit 202 of FIG. 2. The embodiments are not limited in this context.

In various embodiments, apparatus 600 may comprise or be arranged to communicatively couple with a memory unit 604. Memory unit 604 may be implemented using any machine-readable or computer-readable media capable of storing data, including both volatile and non-volatile memory. Examples of memory unit 604 may include, without limitation, any of the examples previously presented with respect to memory unit 204 of FIG. 2. It is worthy of note that some portion or all of memory unit 604 may be included on the same integrated circuit as processor circuit 602, or alternatively some portion or all of memory unit 604 may be disposed on an integrated circuit or other medium, for example a hard disk drive, that is external to the integrated circuit of processor circuit 602. Although memory unit 604 is comprised within apparatus 600 in FIG. 6, memory unit 604 may be external to apparatus 600 in some embodiments. The embodiments are not limited in this context.

In various embodiments, apparatus 600 may comprise a communications component 606. Communications component 606 may comprise logic, circuitry, and/or instructions operative to send messages to one or more remote devices and/or to receive messages from one or more remote devices. In some embodiments, communications component 606 may be operative to send and/or receive messages over one or more wired connections, one or more wireless connections, or a combination of both. In various embodiments, communications component 606 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

FIG. 6 also illustrates a block diagram of a system 640. System 640 may comprise any of the aforementioned elements of apparatus 600. System 640 may further comprise an RF transceiver 642. RF transceiver 642 may comprise one or more radios capable of transmitting and receiving signals using various suitable wireless communications techniques. Such techniques may involve communications across one or more wireless networks. Examples of such wireless networks may include, without limitation, any of the examples previously presented with respect to RF transceiver 242 of FIG. 2. In communicating across such networks, RF transceiver 642 may operate in accordance with one or more applicable standards in any version. The embodiments are not limited in this context.

In some embodiments, system 640 may comprise one or more RF antennas 644. Examples of RF antenna(s) 644 may include, without limitation, any of the examples previously presented with respect to RF antenna(s) 244 of FIG. 2. In various embodiments, RF transceiver 642 may be operative to send and/or receive messages and/or data using one or more RF antennas 644. The embodiments are not limited in this context.

In various embodiments, system 640 may comprise a display 646. Display 646 may comprise any display device capable of displaying information received from processor circuit 602. Examples for display 646 may include a television, a monitor, a projector, and a computer screen. In one embodiment, for example, display 646 may be implemented by a liquid crystal display (LCD), light emitting diode (LED) or other type of suitable visual interface. Display 646 may comprise, for example, a touch-sensitive display screen ("touchscreen"). In some implementations, display 646 may comprise one or more thin-film transistors (TFT) LCD including embedded transistors. The embodiments, however, are not limited to these examples.

In some embodiments, during operation of apparatus 600 and/or system 640, communications component 606 may be operative to send an access network information request 610 to ANDSF server 660. In various embodiments, the access network information request 610 may comprise a request for information that is usable by apparatus 600 and/or system 640 to select an access network via which to obtain connectivity to a PDN such as the Internet. In some embodiments, apparatus 600 and/or system 640 may comprise a dual-mode UE that is capable of communicating with both a 3GPP access network, such as an E-UTRAN, and a non-3GPP access network, such as a Wi-Fi access network. In various embodiments, communications component 606 may be operative to send access network information request 610 while apparatus 600 and/or system 640 is located in a region of overlapping coverage of multiple access networks, such as a region in which in which coverage of an E-UTRAN overlaps with coverage of a Wi-Fi access network. In some embodiments, apparatus 600 and/or system 640 may be operative to communicate with ANDSF server 660 via an IP-layer interface. For example, in various embodiments, apparatus 600 and/or system 640 may be operative to communicate with ANDSF server 660 over an S14 interface connection 612. In some embodiments, communications component 606 may be operative to send access network information request 610 to ANDSF server 660 via the S14 interface connection 612. The embodiments are not limited in this context.

In various embodiments, communications component 606 may be operative to include capabilities information 614 in access network information request 610. Capabilities information 614 may comprise information describing wireless network access capabilities of apparatus 600 and/or system 640. In some embodiments, capabilities information 614 may identify one or more types of wireless access networks and/or access technologies that apparatus 600 and/or system 640 is capable of using. In various embodiments, capabilities information 614 may indicate that apparatus 600 and/or system 640 is capable of communicating with both a 3GPP access network, such as an E-UTRAN, and a non-3GPP access network, such as a Wi-Fi access network. The embodiments are not limited in this context.

In some embodiments, communications component 606 may be operative to include location information 616 in access network information request 610. Location information 616 may comprise information identifying or describing an approximate location of apparatus 600 and/or system 640. In various embodiments, location information 616 may identify an approximate geographical location of apparatus 600 and/or system 640. In some embodiments, for example, location information 616 may comprise GPS coordinates for apparatus 600 and/or system 640. In various embodiments, location information 616 may additionally or alternatively comprise a cell ID that identifies a cell in which apparatus 600 and/or system 640 is currently located. In some embodiments, location information 616 may additionally or alternatively comprise a TAI that identifies a tracking area in which apparatus 600 and/or system 640 is currently located. The embodiments are not limited in this context.

In various embodiments, in response to access network information request 610, communications component 606 may be operative to receive an access network information response 630. In some embodiments, communications component 606 may be operative to receive access network information response 630 from ANDSF server 660 over S14 interface connection 612. In various embodiments, access network information response 630 may comprise available network information 620. Available network information 620 may comprise information identifying one or more access networks via which apparatus 600 and/or system 640 may obtain PDN connectivity. In some embodiments, access network information 618 may comprise mobility policy information 622. Mobility policy information 622 may comprise information identifying, defining, describing, and/or updating rules and/or preferences to be applied by apparatus 600 and/or system 640 in selecting from among access networks identified by available network information 620. The embodiments are not limited in this context.

In various embodiments, access network information response 630 may include one or more parameters of an ANDSF management object, such as ANDSF management object 224 of FIG. 2 and/or management object 300 of FIG. 3. In some embodiments, the ANDSF management object may comprise one or more Hotspot 2.0 MO nodes. In various embodiments, the ANDSF management object may comprise a WLAN selection policy branch, such as WLANSP branch 226 of FIG. 2 and/or management object branch 500 of FIG. 5. In some such embodiments, the one or more Hotspot 2.0 MO nodes may be comprised in the WLAN selection policy branch of the ANDSF management object. In various embodiments, access network information response 630 may include one or more parameters that correspond to Hotspot 2.0 MO nodes within the ANDSF management object. The embodiments are not limited in this context.

In some embodiments, communications component 606 may be operative to select an access network for use to obtain connectivity to a PDN such as the Internet. In various embodiments, communications component 606 may be operative to select the access network based on access network information response 630. In some embodiments, communications component 606 may be operative to select the access network from among one or more available networks identified in available network information 620. In various embodiments, communications component 606 may be operative to select the access network based on one or more rules specified in mobility policy information 622. In some embodiments, communications component 606 may be operative to select the access network based on one or more parameters that are contained in access network information response 630 and that correspond to Hotspot 2.0 MO nodes within an ANDSF management object based upon which access network information response 630 is generated. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 7:
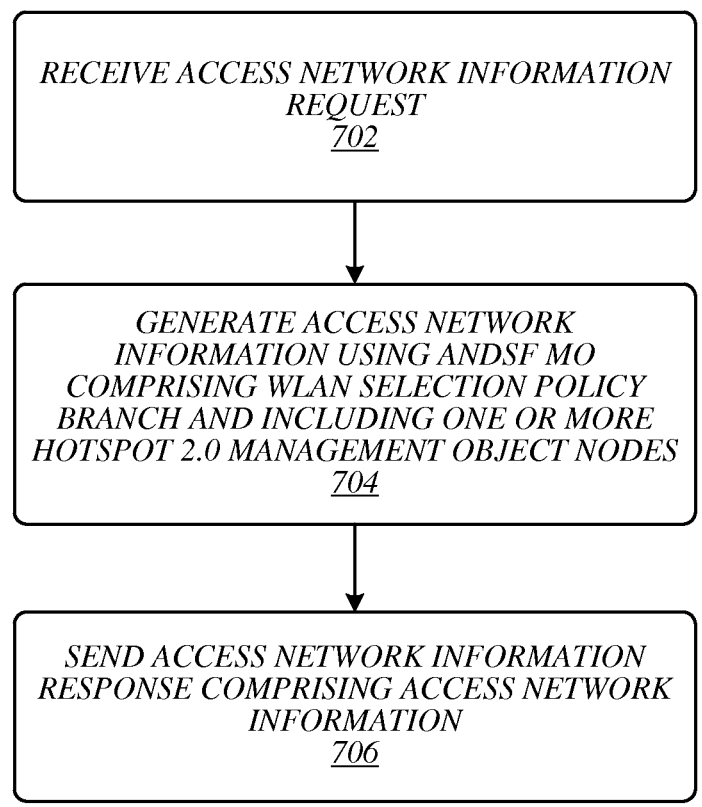
FIG. 7 illustrates an embodiment of a first logic flow.

FIG. 7 illustrates one embodiment of a logic flow 700, which may be representative of the operations executed by one or more embodiments described herein. For example, logic flow 700 may be representative of operations that may be performed by ANDSF server 112 of FIG. 1, apparatus 200 and/or system 240 of FIG. 2, and/or ANDSF server 660 of FIG. 6 in various embodiments. As shown in logic flow 700, an access network information request may be received at 702. For example, communications component 206 of FIG. 2 may be operative to receive access network information request 210 from UE 250 over S14 interface connection 212. At 704, access network information may be generated using an ANDSF MO that comprises a WLAN selection policy branch and includes one or more Hotspot 2.0 MO nodes. For example, ANDSF component 208 of FIG. 2 may be operative to generate access network information 218 using ANDSF management object 224, which may include WLANSP branch 226 and HotSpot 2.0 MO nodes 228. At 706, an access network information response may be sent that comprises the access network information. For example, communications component 206 of FIG. 2 may be operative to send access network information response 230 to UE 250 over S14 interface connection 212. The embodiments are not limited to these examples.

Figure 8:
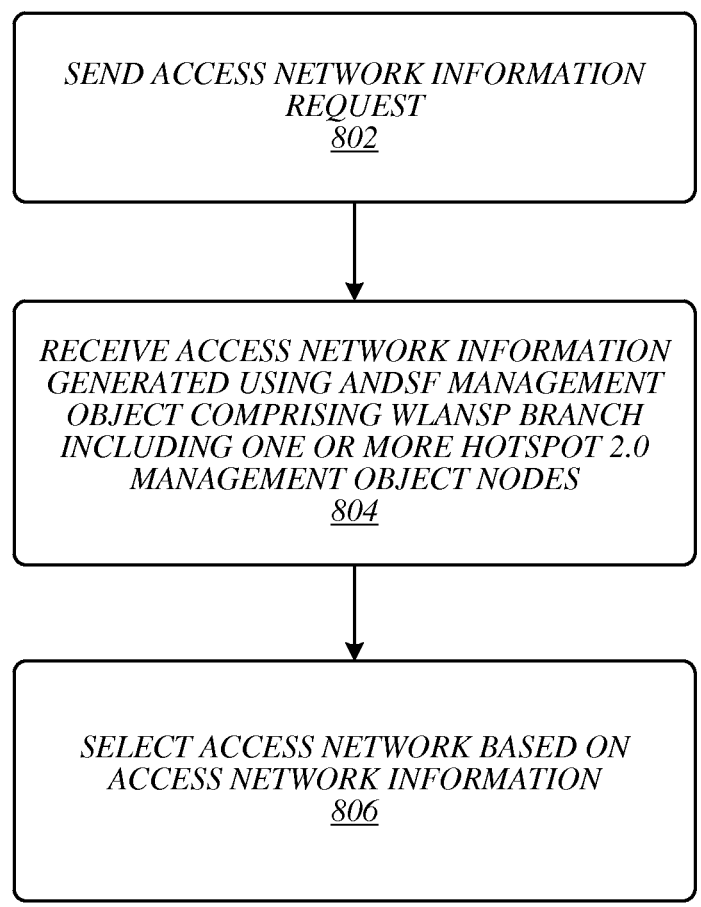
FIG. 8 illustrates an embodiment of a second logic flow.

FIG. 8 illustrates one embodiment of a logic flow 800, which may be representative of the operations executed by one or more embodiments described herein. For example, logic flow 800 may be representative of operations that may be performed by UE 102 of FIG. 1, UE 250 of FIG. 2, and/or apparatus 600 and/or system 640 of FIG. 6 in some embodiments. As shown in logic flow 800, an access network information request may be sent at 802. For example, communications component 606 of FIG. 6 may be operative to send access network information request 610 to ANDSF server 660 over S14 interface connection 612. At 804, access network information may be received that is generated using an ANDSF MO comprising a WLANSP branch that includes one or more Hotspot 2.0 MO nodes. For example, communications component 606 of FIG. 6 may be operative to receive an access network information response 630 containing available network information 620 and/or mobility policy information 622 generated based on an ANDSF MO that comprises a WLANSP branch including one or more Hotspot 2.0 nodes. At 806, an access network may be selected based on the access network information. For example, communications component 606 of FIG. 6 may be operative to select an access network based on access network information in access network information response 630. The embodiments are not limited to these examples.

FIG. 9 illustrates an embodiment of a storage medium 900. Storage medium 900 may comprise any non-transitory computer-readable storage medium or machine-readable storage medium, such as an optical, magnetic or semiconductor storage medium. In various embodiments, storage medium 900 may comprise an article of manufacture. In some embodiments, storage medium 900 may store computer-executable instructions, such as computer-executable instructions to implement one or more of logic flow 700 of FIG. 7 and logic flow 800 of FIG. 8. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 10:
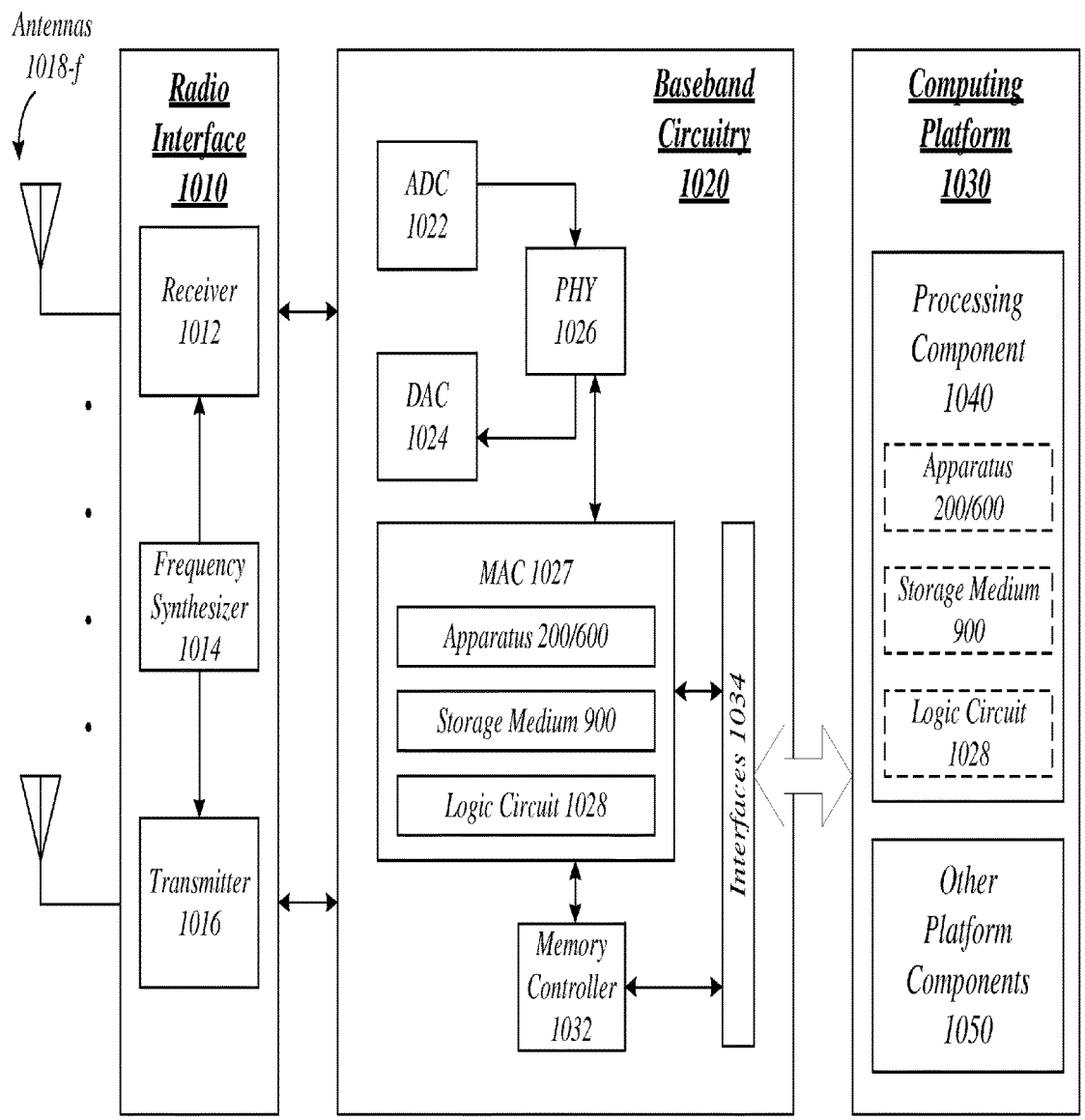
FIG. 10 illustrates an embodiment a device.

FIG. 10 illustrates an embodiment of a communications device 1000 that may implement one or more of apparatus 200 and/or system 240 of FIG. 2, apparatus 600 and/or system 640 of FIG. 6, logic flow 700 of FIG. 7, logic flow 800 of FIG. 8, and storage medium 900 of FIG. 9. In various embodiments, device 1000 may comprise a logic circuit 1028. The logic circuit 1028 may include physical circuits to perform operations described for one or more of apparatus 200 and/or system 240 of FIG. 2, apparatus 600 and/or system 640 of FIG. 6, logic flow 700 of FIG. 7, and logic flow 800 of FIG. 8, for example. As shown in FIG. 10, device 1000 may include a radio interface 1010, baseband circuitry 1020, and computing platform 1030, although the embodiments are not limited to this configuration.

The device 1000 may implement some or all of the structure and/or operations for one or more of apparatus 200 and/or system 240 of FIG. 2, apparatus 600 and/or system 640 of FIG. 6, logic flow 700 of FIG. 7, logic flow 800 of FIG. 8, storage medium 900 of FIG. 9, and logic circuit 1028 in a single computing entity, such as entirely within a single device. Alternatively, the device 1000 may distribute portions of the structure and/or operations for one or more of apparatus 200 and/or system 240 of FIG. 2, apparatus 600 and/or system 640 of FIG. 6, logic flow 700 of FIG. 7, logic flow 800 of FIG. 8, storage medium 900 of FIG. 9, and logic circuit 1028 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1010 may include, for example, a receiver 1012, a frequency synthesizer 1014, and/or a transmitter 1016. Radio interface 1010 may include bias controls, a crystal oscillator and/or one or more antennas 1018-f. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1026 for PHY link layer processing of respective receive/transmit signals. Baseband circuitry 1020 may include, for example, a medium access control (MAC) processing circuit 1027 for MAC/data link layer processing. Baseband circuitry 1020 may include a memory controller 1032 for communicating with MAC processing circuit 1027 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames. Alternatively or in addition, MAC processing circuit 1027 may share processing for certain of these functions or perform these processes independent of PHY processing circuit 1026. In some embodiments, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for one or more of apparatus 200 and/or system 240 of FIG. 2, apparatus 600 and/or system 640 of FIG. 6, logic flow 700 of FIG. 7, logic flow 800 of FIG. 8, storage medium 900 of FIG. 9, and logic circuit 1028 using the processing component 1040. The processing component 1040 (and/or PHY 1026 and/or MAC 1027) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired.

Embodiments of device 1000 may be implemented using single input single output (SISO) architectures. However, certain implementations may include multiple antennas (e.g., antennas 1018-*f*) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 11:
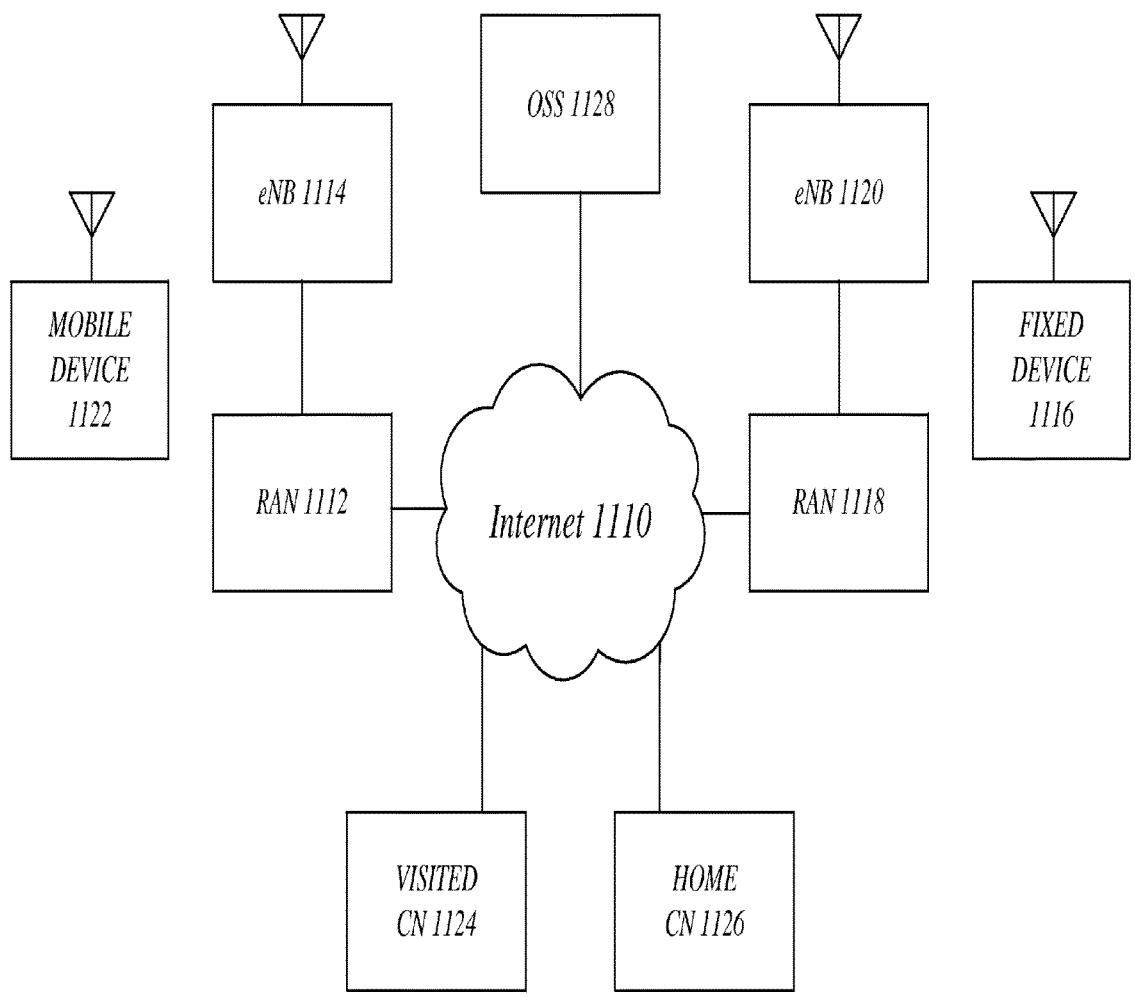
FIG. 11 illustrates an embodiment of a wireless network.

FIG. 11 illustrates an embodiment of a broadband wireless access system 1100. As shown in FIG. 11, broadband wireless access system 1100 may be an internet protocol (IP) type network comprising an internet 1110 type network or the like that is capable of supporting mobile wireless access and/or fixed wireless access to internet 1110. In one or more embodiments, broadband wireless access system 1100 may comprise any type of orthogonal frequency division multiple access (OFDMA) based wireless network, such as a system compliant with one or more of the 3GPP LTE Specifications and/or IEEE 802.16 Standards, and the scope of the claimed subject matter is not limited in these respects.

In the exemplary broadband wireless access system 1100, radio access networks (RANs) 1112 and 1118 are capable of coupling with evolved node Bs (eNBs) 1114 and 1120, respectively, to provide wireless communication between one or more fixed devices 1116 and internet 1110 and/or between or one or more mobile devices 1122 and Internet 1110. One example of a fixed device 1116 and a mobile device 1122 is device 1000 of FIG. 10, with the fixed device 1116 comprising a stationary version of device 1000 and the mobile device 1122 comprising a mobile version of device 1000. RANs 1112 and 1118 may implement profiles that are capable of defining the mapping of network functions to one or more physical entities on broadband wireless access system 1100. eNBs 1114 and 1120 may comprise radio equipment to provide RF communication with fixed device 1116 and/or mobile device 1122, such as described with reference to device 1000, and may comprise, for example, the PHY and MAC layer equipment in compliance with a 3GPP LTE Specification or an IEEE 802.16 Standard. eNBs 1114 and 1120 may further comprise an IP backplane to couple to Internet 1110 via RANs 1112 and 1118, respectively, although the scope of the claimed subject matter is not limited in these respects.

Broadband wireless access system 1100 may further comprise a visited core network (CN) 1124 and/or a home CN 1126, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 1124 and/or home CN 1126, and the scope of the claimed subject matter is not limited in these respects. Visited CN 1124 may be referred to as a visited CN in the case where visited CN 1124 is not part of the regular service provider of fixed device 1116 or mobile device 1122, for example where fixed device 1116 or mobile device 1122 is roaming away from its respective home CN 1126, or where broadband wireless access system 1100 is part of the regular service provider of fixed device 1116 or mobile device 1122 but where broadband wireless access system 1100 may be in another location or state that is not the main or home location of fixed device 1116 or mobile device 1122. The embodiments are not limited in this context.

Fixed device 1116 may be located anywhere within range of one or both of eNBs 1114 and 1120, such as in or near a home or business to provide home or business customer broadband access to Internet 1110 via eNBs 1114 and 1120 and RANs 1112 and 1118, respectively, and home CN 1126. It is worthy of note that although fixed device 1116 is generally disposed in a stationary location, it may be moved to different locations as needed. Mobile device 1122 may be utilized at one or more locations if mobile device 1122 is within range of one or both of eNBs 1114 and 1120, for example. In accordance with one or more embodiments, operation support system (OSS) 1128 may be part of broadband wireless access system 1100 to provide management functions for broadband wireless access system 1100 and to provide interfaces between functional entities of broadband wireless access system 1100. Broadband wireless access system 1100 of FIG. 11 is merely one type of wireless network showing a certain number of the components of broadband wireless access system 1100, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an evolved packet core (EPC) node, comprising a processor circuit to implement an access network discovery and selection function (ANDSF) according to a management object that includes a branch comprising one or more policies to select a wireless local area network (WLAN), the processing circuitry to receive capabilities information and location information for a user equipment (UE) and determine access network information for the UE based on the capabilities information and the location information.

In Example 2, the management object of Example 1 may optionally comprise an ANDSF management object.

In Example 3, the branch of any of Examples 1 to 2 may optionally comprise one or more nodes of a Hotspot management object.

In Example 4, the Hotspot management object of Example 3 may optionally comprise a Hotspot 2.0 management object.

In Example 5, the branch of any of Examples 1 to 4 may optionally comprise a WLAN selection policy (WLANSP) branch of an ANDSF management object.

In Example 6, the processing circuitry of any of Examples 1 to 5 may optionally send the access network information to the UE over an S14 interface connection.

In Example 7, the access network information of any of Examples 1 to 6 may optionally identify one or more available access networks for the UE.

In Example 8, the access network information of any of Examples 1 to 7 may optionally identify one or more policies for selecting among available access networks.

Example 9 is a system, comprising an EPC node according to any of Examples 1 to 8, a radio frequency (RF) transceiver, and one or more RF antennas.

Example 10 is an access network discovery and selection function (ANDSF) server, comprising logic, at least a portion of which is in hardware, the logic to receive an access network information request, generate access network information using an ANDSF management object (MO) comprising a wireless local area network (WLAN) selection policy branch, and send an access network information response comprising the access network information, the ANDSF MO including one or more nodes of a Hotspot 2.0 MO.

In Example 11, the one or more nodes of the Hotspot 2.0 MO of Example 10 may optionally be comprised in the WLAN selection policy branch of the ANDSF MO.

In Example 12, the ANDSF MO of any of Examples 10 to 11 may optionally include a PreferredRoamingPartnerList node of the Hotspot 2.0 MO, and the PreferredRoamingPartnerList node may optionally comprise a list of preferred roaming partners for a user equipment (UE).

In Example 13, the ANDSF MO of any of Examples 10 to 12 may optionally include a RequiredProtoPortTuple node of the Hotspot 2.0 MO, and the RequiredProtoPortTuple node may optionally comprise required internet protocol (IP) protocols and port numbers of one or more operator-supported applications of a user equipment (UE).

In Example 14, the ANDSF MO of any of Examples 10 to 13 may optionally include an SPExclusionList node of the Hotspot 2.0 MO, and the SPExclusionList node may optionally comprise a list of service set identifiers (SSIDs) that are not preferred by a home service provider of a user equipment (UE).

In Example 15, the ANDSF MO of any of Examples 10 to 14 may optionally include a MinBackhaulThreshold node of the Hotspot 2.0 MO, and the MinBackhaulThreshold node may optionally comprise a policy specifying a minimum available backhaul threshold for application to a selection of a WLAN.

In Example 16, the ANDSF MO of any of Examples 10 to 15 may optionally comprise a MaximumBSSLoadValue leaf of the Hotspot 2.0 MO, and the MaximumBSSLoadValue leaf may optionally comprise a policy specifying a maximum basic service set (BSS) load for application to a selection of a WLAN.

In Example 17, the logic of any of Examples 10 to 16 may optionally send the access network information response over an S14 interface connection.

Example 18 is a system, comprising an ANDSF server according to any of Examples 10 to 17, a radio frequency (RF) transceiver, and one or more RF antennas.

Example 19 is an access network discovery and selection function (ANDSF) node, comprising processing circuitry to receive a request for access network information, the request comprising capabilities information and location information for a user equipment (UE), determine access network information for the UE based on an ANDSF management object (MO) that comprises a plurality of Hotspot 2.0 MO nodes, the ANDSF MO excluding one or more other nodes of the Hotspot 2.0 MO, and send a response to the request over an S14 interface connection, the response comprising the access network information.

In Example 20, the ANDSF MO of Example 19 may optionally comprise a wireless local area network selection policy (WLANSP) branch.

In Example 21, the WLANSP branch of any of Examples 19 to 20 may optionally comprise at least one of the plurality of Hotspot 2.0 MO nodes.

In Example 22, the access network information of any of Examples 19 to 21 may optionally comprise one or more parameters determined based on a RequiredProtoPortTuple node comprised among the plurality of Hotspot 2.0 MO nodes.

In Example 23, the access network information of any of Examples 19 to 22 may optionally comprise one or more parameters determined based on a SPExclusionList node comprised among the plurality of Hotspot 2.0 MO nodes.

In Example 24, the access network information of any of Examples 19 to 23 may optionally comprise one or more parameters determined based on a PreferredRoamingPartnerList node comprised among the plurality of Hotspot 2.0 MO nodes.

In Example 25, the access network information of any of Examples 19 to 24 may optionally comprise available network information identifying one or more access networks.

In Example 26, the access network information of any of Examples 19 to 25 may optionally comprise mobility policy information identifying one or more policies for selecting among available access networks.

Example 27 is a system, comprising an ANDSF node according to any of Examples 19 to 26, a radio frequency (RF) transceiver, and one or more RF antennas.

Example 28 is user equipment (UE), comprising a radio frequency (RF) transceiver, and processing circuitry operative on the RF transceiver to send an access network information request and receive access network information in response to the access network information request, the access network information comprising available network information generated using an ANDSF management object (MO) comprising a wireless local area network selection policy (WLANSP) branch that includes at least one node of a Hotspot 2.0 MO and omits at least one other node of the Hotspot 2.0 MO.

In Example 29, the ANDSF MO of Example 28 may optionally comprise an inter-system routing policy (ISRP) branch that is distinct from the WLANSP branch.

In Example 30, the ANDSF MO of any of Examples 28 to 29 may optionally exclude a SubscriptionPriority branch of the Hotspot 2.0 MO.

In Example 31, the access network information of any of Examples 28 to 30 may optionally comprise at least one mobility policy for the UE.

In Example 32, the processing circuitry of Example 31 may optionally select an access network based on the available network information and the at least one mobility policy.

In Example 33, the processing circuitry of any of Examples 28 to 32 may optionally be operative on the RF transceiver to receive the access network information from an ANDSF server via an S14 interface.

In Example 34, the WLANSP branch of any of Examples 28 to 33 may optionally include a Hotspot 2.0 MO node that comprises a list of non-preferred service set identifiers (SSIDs).

In Example 35, the WLANSP branch of any of Examples 28 to 34 may optionally include a Hotspot 2.0 MO node that comprises a list of preferred roaming partners for the UE.

Example 36 is a system, comprising a UE according to any of Examples 28 to 35, a display, a radio frequency (RF) transceiver, and one or more RF antennas.

Example 37 is at least one non-transitory computer-readable storage medium comprising a set of wireless communication instructions that, in response to execution on a computing device, cause the computing device to receive an access network information request, generate access network information using an ANDSF management object (MO) comprising a wireless local area network (WLAN) selection policy branch, and send an access network information response comprising the access network information, the ANDSF MO including one or more nodes of a Hotspot 2.0 MO.

In Example 38, the one or more nodes of the Hotspot 2.0 MO of Example 37 may optionally be comprised in the WLAN selection policy branch of the ANDSF MO.

In Example 39, the ANDSF MO of any of Examples 37 to 38 may optionally include a PreferredRoamingPartnerList node of the Hotspot 2.0 MO, and the PreferredRoamingPartnerList node may optionally comprise a list of preferred roaming partners for a user equipment (UE).

In Example 40, the ANDSF MO of any of Examples 37 to 39 may optionally include a RequiredProtoPortTuple node of the Hotspot 2.0 MO, and the RequiredProtoPortTuple node may optionally comprise required internet protocol (IP) protocols and port numbers of one or more operator-supported applications of a user equipment (UE).

In Example 41, the ANDSF MO of any of Examples 37 to 40 may optionally include an SPExclusionList node of the Hotspot 2.0 MO, and the SPExclusionList node may optionally comprise a list of service set identifiers (SSIDs) that are not preferred by a home service provider of a user equipment (UE).

In Example 42, the ANDSF MO of any of Examples 37 to 41 may optionally include a MinBackhaulThreshold node of the Hotspot 2.0 MO, and the MinBackhaulThreshold node may optionally comprise a policy specifying a minimum available backhaul threshold for application to a selection of a WLAN.

In Example 43, the ANDSF MO of any of Examples 37 to 42 may optionally comprise a MaximumBSSLoadValue leaf of the Hotspot 2.0 MO, and the MaximumBSSLoadValue leaf may optionally comprise a policy specifying a maximum basic service set (BSS) load for application to a selection of a WLAN.

In Example 44, the at least one non-transitory computer-readable storage medium of any of Examples 37 to 43 may optionally comprise wireless communication instructions that, in response to being executed on the computing device, cause the computing device to send the access network information response over an S14 interface connection.

Example 45 is a wireless communication method, comprising sending, by a user equipment (UE), an access network information request, and receiving access network information in response to the access network information request, the access network information comprising available network information generated using an ANDSF management object (MO) comprising a wireless local area network selection policy (WLANSP) branch that includes at least one node of a Hotspot 2.0 MO and omits at least one other node of the Hotspot 2.0 MO.

In Example 46, the ANDSF MO of Example 45 may optionally comprise an inter-system routing policy (ISRP) branch that is distinct from the WLANSP branch.

In Example 47, the ANDSF MO of any of Examples 45 to 46 may optionally exclude a SubscriptionPriority branch of the Hotspot 2.0 MO.

In Example 48, the access network information of any of Examples 45 to 47 may optionally comprise at least one mobility policy for the UE.

In Example 49, the wireless communication method of Example 48 may optionally comprise selecting an access network based on the available network information and the at least one mobility policy.

In Example 50, the wireless communication method of any of Examples 45 to 49 may optionally comprise receiving the access network information from an ANDSF server via an S14 interface.

In Example 51, the WLANSP branch of any of Examples 45 to 50 may optionally include a Hotspot 2.0 MO node that comprises a list of non-preferred service set identifiers (SSIDs).

In Example 52, the WLANSP branch of any of Examples 45 to 51 may optionally include a Hotspot 2.0 MO node that comprises a list of preferred roaming partners for the UE.

Example 53 is at least one non-transitory computer-readable storage medium comprising a set of instructions that, in response to being executed on a computing device, cause the computing device to perform a wireless communication method according to any of Examples 45 to 52.

Example 54 is an apparatus, comprising means for performing a wireless communication method according to any of Examples 45 to 52.

Example 55 is a system, comprising an apparatus according to Example 54, a display, a radio frequency (RF) transceiver, and one or more RF antennas.

Example 56 is at least one non-transitory computer-readable storage medium comprising a set of wireless communication instructions that, in response to being executed on a computing device, cause the computing device to implement an access network discovery and selection function (ANDSF) according to a management object that includes a branch comprising one or more policies to select a wireless local area network (WLAN), receive capabilities information and location information for a user equipment (UE), and determine access network information for the UE based on the capabilities information and the location information.

In Example 57, the management object of Example 56 may optionally comprise an ANDSF management object.

In Example 58, the branch of any one of Examples 56 to 57 may optionally comprise one or more nodes of a Hotspot management object.

In Example 59, the Hotspot management object of Example 58 may optionally comprise a Hotspot 2.0 management object.

In Example 60, the branch of any of Examples 56 to 59 may optionally comprise a WLAN selection policy (WLANSP) branch of an ANDSF management object.

In Example 61, the at least one non-transitory computer-readable storage medium of any of Examples 56 to 60 may optionally comprise wireless communication instructions that, in response to being executed on the computing device, cause the computing device to send the access network information to the UE over an S14 interface connection.

In Example 62, the access network information of any of Examples 56 to 61 may optionally identify one or more available access networks for the UE.

In Example 63, the access network information of any of Examples 56 to 62 may optionally identify one or more policies for selecting among available access networks.

Example 64 is a wireless communication method, comprising receiving an access network information request, generating, by a processor circuit, access network information using an ANDSF management object (MO) comprising a wireless local area network (WLAN) selection policy branch, and sending an access network information response comprising the access network information, the ANDSF MO including one or more nodes of a Hotspot 2.0 MO.

In Example 65, the one or more nodes of the Hotspot 2.0 MO of Example 64 may optionally be comprised in the WLAN selection policy branch of the ANDSF MO.

In Example 66, the ANDSF MO of any of Examples 64 to 65 may optionally include a PreferredRoamingPartnerList node of the Hotspot 2.0 MO, and the PreferredRoamingPartnerList node may optionally comprise a list of preferred roaming partners for a user equipment (UE).

In Example 67, the ANDSF MO of any of Examples 64 to 66 may optionally include a RequiredProtoPortTuple node of the Hotspot 2.0 MO, and the RequiredProtoPortTuple node may optionally comprise required internet protocol (IP) protocols and port numbers of one or more operator-supported applications of a user equipment (UE).

In Example 68, the ANDSF MO of any of Examples 64 to 67 may optionally include an SPExclusionList node of the Hotspot 2.0 MO, and the SPExclusionList node may optionally comprise a list of service set identifiers (SSIDs) that are not preferred by a home service provider of a user equipment (UE).

In Example 69, the ANDSF MO of any of Examples 64 to 68 may optionally include a MinBackhaulThreshold node of the Hotspot 2.0 MO, and the MinBackhaulThreshold node may optionally comprise a policy specifying a minimum available backhaul threshold for application to a selection of a WLAN.

In Example 70, the ANDSF MO of any of Examples 64 to 69 may optionally comprise a MaximumBSSLoadValue leaf of the Hotspot 2.0 MO, and the MaximumBSSLoad- Value leaf may optionally comprise a policy specifying a maximum basic service set (BSS) load for application to a selection of a WLAN.

In Example 71, the wireless communication method of any of Examples 64 to 70 may optionally comprise sending the access network information response over an S14 interface connection.

Example 72 is at least one non-transitory computer-readable storage medium comprising a set of instructions that, in response to being executed on a computing device, cause the computing device to perform a wireless communication method according to any of Examples 64 to 71.

Example 73 is an apparatus, comprising means for performing a wireless communication method according to any of Examples 64 to 71.

Example 74 is a system, comprising an apparatus according to Example 73, a radio frequency (RF) transceiver, and one or more RF antennas.

Example 75 is at least one non-transitory computer-readable storage medium comprising a set of wireless communication instructions that, in response to execution on a computing device, cause the computing device to receive a request for access network information, the request comprising capabilities information and location information for a user equipment (UE), determine access network information for the UE based on an ANDSF management object (MO) that comprises a plurality of Hotspot 2.0 MO nodes, the ANDSF MO excluding one or more other nodes of the Hotspot 2.0 MO, and send a response to the request over an S14 interface connection, the response comprising the access network information.

In Example 76, the ANDSF MO of Example 75 may optionally comprise a wireless local area network selection policy (WLANSP) branch.

In Example 77, the WLANSP branch of any of Examples 75 to 76 may optionally comprise at least one of the plurality of Hotspot 2.0 MO nodes.

In Example 78, the access network information of any of Examples 75 to 77 may optionally comprise one or more parameters determined based on a RequiredProtoPortTuple node comprised among the plurality of Hotspot 2.0 MO nodes.

In Example 79, the access network information of any of Examples 75 to 78 may optionally comprise one or more parameters determined based on a SPExclusionList node comprised among the plurality of Hotspot 2.0 MO nodes.

In Example 80, the access network information of any of Examples 75 to 79 may optionally comprise one or more parameters determined based on a PreferredRoamingPartnerList node comprised among the plurality of Hotspot 2.0 MO nodes.

In Example 81, the access network information of any of Examples 75 to 80 may optionally comprise available network information identifying one or more access networks.

In Example 82, the access network information of any of Examples 75 to 81 may optionally comprise mobility policy information identifying one or more policies for selecting among available access networks.

Example 83 is a wireless communication method, comprising implementing an access network discovery and selection function (ANDSF) according to a management object that includes a branch comprising one or more policies to select a wireless local area network (WLAN), receiving capabilities information and location information for a user equipment (UE), and determining, by a processor circuit, access network information for the UE based on the capabilities information and the location information.

In Example 84, the management object of Example 83 may optionally comprise an ANDSF management object.

In Example 85, the branch of any of Examples 83 to 84 may optionally comprise one or more nodes of a Hotspot management object.

In Example 86, the Hotspot management object of Example 85 may optionally comprise a Hotspot 2.0 management object.

In Example 87, the branch of any of Examples 83 to 86 may optionally comprise a WLAN selection policy (WLANSP) branch of an ANDSF management object.

In Example 88, the wireless communication method of any of Examples 83 to 87 may optionally comprise sending the access network information to the UE over an S14 interface connection.

In Example 89, the access network information of any of Examples 83 to 88 may optionally identify one or more available access networks for the UE.

In Example 90, the access network information of any of Examples 83 to 89 may optionally identify one or more policies for selecting among available access networks.

Example 91 is at least one non-transitory computer-readable storage medium comprising a set of instructions that, in response to being executed on a computing device, cause the computing device to perform a wireless communication method according to any of Examples 83 to 90.

Example 92 is an apparatus, comprising means for performing a wireless communication method according to any of Examples 83 to 90.

Example 93 is a system, comprising an apparatus according to Example 92, a radio frequency (RF) transceiver, and one or more RF antennas.

Example 94 is at least one non-transitory computer-readable storage medium comprising a set of wireless communication instructions that, in response to being executed on a user equipment (UE), cause the UE to send an access network information request, and receive access network information in response to the access network information request, the access network information comprising available network information generated using an ANDSF management object (MO) comprising a wireless local area network selection policy (WLANSP) branch that includes at least one node of a Hotspot 2.0 MO and omits at least one other node of the Hotspot 2.0 MO.

In Example 95, the ANDSF MO of Example 94 may optionally comprise an inter-system routing policy (ISRP) branch that is distinct from the WLANSP branch.

In Example 96, the ANDSF MO of any of Examples 94 to 95 may optionally exclude a SubscriptionPriority branch of the Hotspot 2.0 MO.

In Example 97, the access network information of any of Examples 94 to 96 may optionally comprise at least one mobility policy for the UE.

In Example 98, the at least one non-transitory computer-readable storage medium of Example 97 may optionally comprise wireless communication instructions that, in response to being executed on the UE, cause the UE to select an access network based on the available network information and the at least one mobility policy.

In Example 99, the at least one non-transitory computer-readable storage medium of any of Examples 94 to 98 may optionally comprise wireless communication instructions that, in response to being executed on the UE, cause the UE to receive the access network information from an ANDSF server via an S14 interface.

In Example 100, the WLANSP branch of any of Examples 94 to 99 may optionally include a Hotspot 2.0 MO node that comprises a list of non-preferred service set identifiers (SSIDs).

In Example 101, the WLANSP branch of any of Examples 94 to 100 may optionally include a Hotspot 2.0 MO node that comprises a list of preferred roaming partners for the UE.

Example 102 is a wireless communication method, comprising receiving a request for access network information, the request comprising capabilities information and location information for a user equipment (UE), determining, by a processor circuit, access network information for the UE based on an ANDSF management object (MO) that comprises a plurality of Hotspot 2.0 MO nodes, the ANDSF MO excluding one or more other nodes of the Hotspot 2.0 MO, and sending a response to the request over an S14 interface connection, the response comprising the access network information.

In Example 103, the ANDSF MO of Example 102 may optionally comprise a wireless local area network selection policy (WLANSP) branch.

In Example 104, the WLANSP branch of any of Examples 102 to 103 may optionally comprise at least one of the plurality of Hotspot 2.0 MO nodes.

In Example 105, the access network information of any of Examples 102 to 104 may optionally comprise one or more parameters determined based on a RequiredProtoPortTuple node comprised among the plurality of Hotspot 2.0 MO nodes.

In Example 106, the access network information of any of Examples 102 to 105 may optionally comprise one or more parameters determined based on a SPExclusionList node comprised among the plurality of Hotspot 2.0 MO nodes.

In Example 107, the access network information of any of Examples 102 to 106 may optionally comprise one or more parameters determined based on a PreferredRoamingPartnerList node comprised among the plurality of Hotspot 2.0 MO nodes.

In Example 108, the access network information of any of Examples 102 to 107 may optionally comprise available network information identifying one or more access networks.

In Example 109, the access network information of any of Examples 102 to 108 may optionally comprise mobility policy information identifying one or more policies for selecting among available access networks.

Example 110 is at least one non-transitory computer-readable storage medium comprising a set of instructions that, in response to being executed on a computing device, cause the computing device to perform a wireless communication method according to any of Examples 102 to 109.

Example 111 is an apparatus, comprising means for performing a wireless communication method according to any of Examples 102 to 109.

Example 112 is a system, comprising an apparatus according to Example 111, a radio frequency (RF) transceiver, and one or more RF antennas.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
   processing circuitry; and
   non-transitory computer-readable storage media having stored thereon instructions for execution by the processing circuitry to cause user equipment (UE) to:
   identify a plurality of available wireless local area networks (WLANs);
   select a WLAN from among the plurality of available WLANs based on WLAN selection criteria specified by a WLAN selection policy (WLANSP) rule comprised in an access network discovery and selection function (ANDSF) management object (MO) for the UE, the WLAN selection criteria contained in a selection criteria sub-branch of a WLANSP branch of the ANDSF MO; and
   establish packet data network (PDN) connectivity via the selected WLAN.

2. The apparatus of claim 1, the non-transitory computer-readable storage media having stored thereon instructions for execution by the processing circuitry to cause the UE to identify the plurality of available WLANs based on received access network information.

3. The apparatus of claim 2, the non-transitory computer-readable storage media having stored thereon instructions for execution by the processing circuitry to cause the UE to:
   send an access network information request over an S14 interface connection; and
   receive the access network information over the S14 interface connection in response to the access network information request.

4. The apparatus of claim 1, the WLANSP branch to include a ValidityArea node specifying one or more location conditions for the WLANSP rule.

5. The apparatus of claim 1, one or more of the WLAN selection criteria defined by a PreferredRoamingPartnerList node comprised in the selection criteria sub-branch of the ANDSF MO.

6. The apparatus of claim 1, one or more of the WLAN selection criteria defined by a MinBackhaulThreshold node comprised in the selection criteria sub-branch of the ANDSF MO.

7. The apparatus of claim 1, one or more of the WLAN selection criteria defined by a RequiredProtoPortTuple node comprised in the selection criteria sub-branch of the ANDSF MO.

8. The apparatus of claim 1, one or more of the WLAN selection criteria defined by a SPExclusionList node comprised in the selection criteria sub-branch of the ANDSF MO.

9. The apparatus of claim 1, one or more of the WLAN selection criteria defined by a MaximumBSSLoadValue node comprised in the selection criteria sub-branch of the ANDSF MO.

10. The apparatus of claim 1, the ANDSF MO to comprise an inter-system routing policy (ISRP) branch that is distinct from the WLANSP branch.

11. The apparatus of claim 1, the ANDSF MO to comprise a home network preference branch containing an S2aConnectivityPreference leaf comprising a value to indicate whether a home operator of the UE prefers the UE to use S2a procedures to establish PDN connections over WLANs.

12. The apparatus of claim 1, further comprising:
    at least one radio frequency (RF) transceiver; and
    at least one RF antenna.

13. At least one non-transitory computer-readable storage medium storing instructions for execution by processing circuitry to cause user equipment (UE) to:
    identify a plurality of available wireless local area networks (WLANs);
    select a WLAN from among the plurality of available WLANs based on WLAN selection criteria specified by a WLAN selection policy (WLANSP) rule comprised in an access network discovery and selection function (ANDSF) management object (MO) for the UE, the WLAN selection criteria contained in a selection criteria sub-branch of a WLANSP branch of the ANDSF MO; and
    establish packet data network (PDN) connectivity via the selected WLAN.

14. The at least one non-transitory computer-readable storage medium of claim 13, storing instructions for execution by the processing circuitry to cause the UE to identify the plurality of available WLANs based on received access network information.

15. The at least one non-transitory computer-readable storage medium of claim 14, storing instructions for execution by the processing circuitry to cause the UE to:
    send an access network information request over an S14 interface connection; and
    receive the access network information over the S14 interface connection in response to the access network information request.

16. The at least one non-transitory computer-readable storage medium of claim 13, the WLANSP branch to include a ValidityArea node specifying one or more location conditions for the WLANSP rule.

17. The at least one non-transitory computer-readable storage medium of claim 13, one or more of the WLAN selection criteria defined by a PreferredRoamingPartnerList node comprised in the selection criteria sub-branch of the ANDSF MO.

18. The at least one non-transitory computer-readable storage medium of claim 13, one or more of the WLAN selection criteria defined by a MinBackhaulThreshold node comprised in the selection criteria sub-branch of the ANDSF MO.

19. The at least one non-transitory computer-readable storage medium of claim 13, one or more of the WLAN selection criteria defined by a RequiredProtoPortTuple node comprised in the selection criteria sub-branch of the ANDSF MO.

20. The at least one non-transitory computer-readable storage medium of claim 13, one or more of the WLAN selection criteria defined by a SPExclusionList node comprised in the selection criteria sub-branch of the ANDSF MO.

21. The at least one non-transitory computer-readable storage medium of claim 13, one or more of the WLAN selection criteria defined by a MaximumBSSLoadValue node comprised in the selection criteria sub-branch of the ANDSF MO.

22. The at least one non-transitory computer-readable storage medium of claim 13, the ANDSF MO to comprise an inter-system routing policy (ISRP) branch that is distinct from the WLANSP branch.

23. The at least one non-transitory computer-readable storage medium of claim 13, the ANDSF MO to comprise a home network preference branch containing an S2aConnectivityPreference leaf comprising a value to indicate whether a home operator of the UE prefers the UE to use S2a procedures to establish PDN connections over WLANs.

* * * * *